(12) United States Patent
Lee et al.

(10) Patent No.: US 8,130,646 B2
(45) Date of Patent: Mar. 6, 2012

(54) RESOURCE RESERVATION METHOD USING MULTIPLE INTERFACES IN MOBILE ENVIRONMENTS

(75) Inventors: Sung-hyuck Lee, Daegu (KR); Jong-ho Bang, Suwon-si (KR); Seong-ho Jeong, Seongnam-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 950 days.

(21) Appl. No.: 11/251,977

(22) Filed: Oct. 18, 2005

(65) Prior Publication Data
US 2006/0083238 A1    Apr. 20, 2006

Related U.S. Application Data

(60) Provisional application No. 60/619,005, filed on Oct. 18, 2004.

(30) Foreign Application Priority Data

Apr. 13, 2005 (KR) .......................... 10-2005-0030734

(51) Int. Cl.
*H04L 12/26* (2006.01)
(52) U.S. Cl. .... 370/231; 370/238; 370/328; 370/395.21
(58) Field of Classification Search .......................... None
See application file for complete search history.

(56) References Cited

U.S. PATENT DOCUMENTS

| | | | | |
|---|---|---|---|---|
| 5,367,517 A | * | 11/1994 | Cidon et al. ................. | 370/431 |
| 7,225,268 B2 | * | 5/2007 | Watanabe ...................... | 709/238 |
| 7,342,903 B2 | * | 3/2008 | O'Neill et al. ................. | 370/331 |
| 2002/0150062 A1 | * | 10/2002 | Zheng et al. .................... | 370/331 |
| 2003/0202468 A1 | * | 10/2003 | Cain et al. ...................... | 370/229 |
| 2004/0005894 A1 | * | 1/2004 | Trossen et al. ................ | 455/436 |
| 2004/0017769 A1 | * | 1/2004 | Denecheau et al. ........... | 370/218 |
| 2004/0105420 A1 | * | 6/2004 | Takeda et al. ................. | 370/349 |
| 2004/0142657 A1 | * | 7/2004 | Maeda ......................... | 455/11.1 |
| 2006/0007863 A1 | * | 1/2006 | Naghian ....................... | 370/238 |

* cited by examiner

*Primary Examiner* — Nittaya Juntima
*Assistant Examiner* — Tito Pham
(74) *Attorney, Agent, or Firm* — Sughrue Mion, PLLC

(57) ABSTRACT

A resource reservation system and method in a multihoming environment are disclosed. The method includes: transmitting query messages from the mobile node to multiple adjacent access routers using a plurality of care of addresses (CoAs) stored in the mobile node; transmitting the query messages from the adjacent access routers to a crossover node; at one or more intermediate nodes on a communication path between the adjacent access routers and the crossover node, recording available resource information in the query messages; receiving the query messages at a predetermined correspondent node; analyzing, at the correspondent node, the recorded available resource information in the received query messages and selecting a communication path which transferred a query message containing available resource information indicating the available resources required by the mobile node; and transmitting a resource reservation message from the correspondent node to the mobile node through the selected communication path.

30 Claims, 15 Drawing Sheets

RESOURCE RESERVATION METHOD USING MULTIPLE INTERFACES IN MOBILE ENVIRONMENTS

CROSS-REFERENCE TO RELATED APPLICATIONS

This application claims priority under 35 U.S.C. §119 (e) from U.S. Provisional Application No. 60/619,005 filed on Oct. 18, 2004 in the United States Patent and Trademark Office, and claims priority from Korean Patent Application No. 10-2005-0030734 filed on Apr. 13, 2005 in the Korean Intellectual Property Office, the entire disclosures of which are incorporated herein by reference.

BACKGROUND OF THE INVENTION

1. Field of the Invention

The present invention relates to a resource reservation system and method in a multihoming environment. More particularly, the present invention relates to a resource reservation system and method for performing a resource reservation using a plurality of care of addresses (CoAs) through multiple network interfaces.

2. Description of the Related Art

In a mobile network configured with a plurality of mobile nodes, a predetermined amount of resources must be constantly provided by reserving them in order to guarantee a quality of service (QoS) of a multimedia application even though a mobile node performs a handover. Accordingly, a resource reservation is performed in the mobile network.

In a multihoming environment, a mobile node may have more than two network interfaces. Accordingly, QoS signaling may be performed by selecting one of the Network interfaces that can connect to a path having sufficient resources in the multihoming environment.

Conventional protocols proposed for QoS signaling are the Resource Reservation Protocol (RSVP), Extensions to Resource Reservation Protocol (E-RSVP), Mobile Resource Reservation Protocol (MRSVP), RSVP tunnel, Concatenation and Optimization for Resource reservation Path (CORP), Hierarchical Mobile RSVP (H-RSVP).

The RSVP protocol was proposed for a wired network. Accordingly, the RSVP protocol is not suitable for QoS signaling in a mobile network.

The E-RSVP protocol was developed by modifying the RSVP protocol in order to perform the QoS signaling in a mobile network. The E-RSVP protocol was designed to instantly reserve resources by requesting a PATH message when a mobile node performs a handover. However, the E-RSVP protocol is not suitable for a Sender-initiated resource reservation scheme which reserves resources by transmitting a resource reservation message from a sender.

The MRSVP protocol quickly provides the existing QoS even though a mobile node performs a handover. However, resources are wasted in a mobile network having insufficient resources because a mobile node previously reserves resources of an adjacent cell where the mobile node moves. Also, the reserved resources are not instantly released according to the MRSVP protocol.

The RSVP tunnel protocol provides a QoS in a tunnel. Initially, a RSVP protocol message was not recognized between an entry point of a tunnel and an exit point of a tunnel. The RSVP tunnel protocol solves such a conventional recognition problem. However, the RSVP tunnel protocol does not include a method for rapidly re-reserving resources when a mobile node performs a handover. Furthermore, the RSVP tunnel protocol unnecessarily re-reserves resources on the end-to-end level, and the RSVP tunnel protocol does not have a method of performing a Localized Path Repair by quickly finding a crossover node (CN) when a mobile node performs a handover.

The CORP protocol provides a QoS by expanding an existing resource reservation path using a conventional RSVP protocol when a mobile node performs a handover. In order to expand the resource reservation path, a concatenation for reservation path (CRP) scheme is used. However, the CORP protocol previously reserves resources of an adjacent cell, to which the mobile node moves, in a mobile network having insufficient resources. Also, the CORP protocol performs a point-to-point level resource reservation to reserve resources. Therefore, resources are wasted unnecessarily, according to the CORP protocol.

The H-MRSVP protocol is a resource reservation protocol developed by integrating the RSVP protocol with a regional registration function of a Mobile IP protocol. When a mobile node performs an inter-region handover, resources are reserved by using a reservation tunnel between a gateway mobility agent (GMA) and a new proxy agent. Although the H-MRSVP protocol performs a resource reservation only when a delay time of handover becomes longer, for example, the inter-region handover, the H-MRSVP protocol has a problem of resource usability caused by the unnecessary reservation.

The above-mentioned conventional resource reservation protocols have a common problem that QoS signaling is performed without using of the advantageous characteristics of multihoming. In multihoming, seamless transmission is provided through duplicated physical communication links when one of the physical communication links has a problem, and data traffic is dispersed into a plurality of communication links for improving QoS. Such an advantageous characteristic of multihoming is not supported by conventional resources reservation protocols.

SUMMARY OF THE INVENTION

Accordingly, the present general inventive concept has been developed to solve the above-mentioned problems, and other disadvantages not described above. Also, the present general inventive concept is not required to overcome the disadvantages described above, and an exemplary embodiment of the present invention may not overcome any of the problems described above. An aspect of the present general inventive concept is to provide a resource reservation system and a method for reserving resources through a wireless network interface having sufficient available resources based on multihoming characteristics of a mobile node in an IP based mobile network environment without wasting resources caused by duplicated resource reservations.

It is another aspect of the present invention to provide a resource reservation system and a method for dispersing a load of single path by performing multiple resource reservation using a plurality of wireless network interfaces when one of the communication paths has insufficient resources or when a data congestion problem arises.

In accordance with an aspect of the present invention, there is provided a method of reserving resources in an IP-based mobile network environment, including a mobile node performing a handover, the method including: at the mobile node, transmitting query messages to a plurality of adjacent access routers using a plurality of CoAs (care of address) previously stored in the mobile node; at the plurality of adjacent access routers, transmitting the query messages to a direction of each of a plurality of crossover nodes; at one or more intermediate node on a communication path between the plurality of adjacent access routers and a crossover node, recording own available resource information in the query messages; at a predetermined correspondent node, receiving the query messages; at the correspondent node, analyzing the recorded available resource information in the received query messages and selecting a communication path transferring a query message containing available resource information required by the mobile node; and at the correspondent node, transmitting a resource reservation message to the mobile node through the selected communication path.

When a plurality of query messages having available resource information required by the mobile node is received, the correspondent node may select a first received query message having a shortest transmission delay.

The method may further include: at the correspondent node, assigning a priority to each of the received query messages by assigning a higher priority to a query message having available resource information presenting a larger amount of available resources; and selecting a communication path according to the priority when resources are not reserved through the selected communication path.

When a maximum available resources of the selected communication path is smaller than an amount of the required resources, in the analyzing of the recorded available resource information, the correspondent node may additionally select at least one additional communication path according to the assigned priority.

The recording of the own available resource information may include: at the intermediate node, comparing the available resource information recorded in the query message to own available resource information of the intermediate node, after checking the available resource information of the query message; and at the intermediate node, updating the recorded available resource information to the own available resource information when the intermediate node determines that an amount of own available resources is smaller than an amount of available resources recorded in the available resource information.

The method may further include releasing a resource reservation state by transmitting a resource reservation release message to an old access router of the mobile node at the crossover node on the selected communication path, and a home agent substitutionary may perform the operations performed by the correspondent node.

In accordance with another aspect of the present invention, there is a provided a method of reserving resources of an IP based mobile network having a mobile node performing a handover, the method including: at the mobile node, transmitting a plurality of binding process messages to a correspondent node using a plurality of CoAs (care of addresses) stored in the mobile node; at the correspondent node, transmitting binding acknowledgement messages through a plurality of paths transferring the plurality of binding process messages; at the correspondent node, transmitting query messages through the plurality of paths; at one or more intermediate nodes on the plurality of paths, recording own available resource information in the query messages; at the mobile node, receiving the query messages; at the mobile node, selecting a communication path transferring a query message having available resource information of a predetermined resource amount, after analyzing the available resource information recorded in the query message; and at the mobile node, transmitting a resource reservation message through the selected communication path.

In the selection of the communication path, the mobile node may select a query message which arrived at first when the mobile node receives a plurality of query messages having a same available resource information.

The method may further include: at the mobile node, assigning a priority to each of the received query messages by assigning a higher priority to a query message having available resource information presenting a larger amount of available resources; and at the mobile node, selecting a communication path according to the assigned priority when resources are not reserved through the selected communication path.

In the selection the communication path, the correspondent node may additionally select at least one of the communication paths according to the priority when a maximum available resource amount of the selected communication path is smaller than an amount of resources required by the mobile node.

The recording of the own available resource information may include: at the intermediate node, comparing the available resource information recorded in the query messages and own available resource information of the intermediate node after the intermediate node analyzes the available resource information recorded in the query messages; and at the intermediate node, updating the recorded available resource information to the own available resource information when the intermediate node determines that an amount of own available resource is smaller than an amount of available resources in the recorded available resource information.

The method may further include releasing a resource reservation state by transmitting a resource reservation release message to an old access router of the mobile node at a crossover node on the selected communication path, and a home agent substitutionary may perform the operation of the correspondent node.

In accordance with another aspect of the present invention, there is provided a method of reserving resources to disperse a load of a communication path in an IP-based mobile network, the method including: at a mobile node communicating with a correspondent node through a first predetermined communication path, transmitting query messages to at least one of a plurality of adjacent access routers by using a plurality of CoAs (care of addresses) previously stored in the mobile node; at the adjacent access routers, transmitting the query messages to a direction of a crossover node; at one or more intermediate node on a communication path between the plurality of adjacent access routers and the crossover node, recording own available resource information in the query messages; at the correspondent node, receiving the query messages; at the correspondent node, selecting a second communication path transferring a query message having a maximum available resource information after analyzing the available resource information recorded in the query messages; and at the correspondent node, transmitting a resource reservation message to the mobile node through the selected second communication path.

The method may further include transmitting a first multimedia data traffic and a second multimedia data traffic by using the first communication path and the second communication path at the mobile node and the correspondent node.

In the selection the second communication path, the correspondent node may select a query message which arrived at first when the correspondent node receives a plurality of query messages having a same maximum available resource information.

The method may further include: at the correspondent node, assigning a priority to each of the received query messages by assigning higher priority to a query message having available resource information presenting a larger amount of available resources; and at correspondent node, selecting at least one additional communication path according to the priority when a maximum amount of available resources of the selected second communication path is smaller than an available resource amount required by the mobile node.

The selection of the second communication path may further include selecting a third predetermined communication path according to the priority when resources are not reserved through the selected second communication path.

The selection of the second communication path may include: at the correspondent node, comparing own available resource information and the available resource information recorded in the query message; and at the correspondent node, updating the available resource information recorded in the query message to the own available resource information when the correspondent node determines that an amount of the own available resources is smaller than an amount of available resources recorded in the available resource information of the query message.

In the transmission of the query messages, the mobile node may transmit the query messages when the mobile node determines that data traffic congestion arises on the first communication path.

The method may further include releasing a resource reservation state by transmitting a resource reservation release message to an access router on the first communication path at a crossover node on the second communication path.

In the transmission of the query messages, the mobile node may transmit the query messages when the mobile node determines that available resources on the first communication path are insufficient, and a home agent substitutionary may perform the operations of the correspondent node.

In accordance with still another aspect of the present invention, there is provided a method of reserving resources to disperse a load of a communication path in an IP-based mobile network, the method including: at a mobile node, communicating with a predetermined correspondent node through a first communication path, transmitting a plurality of query messages to the correspondent node by using a plurality of CoAs (care of addresses) previously stored in the mobile node; at one or more intermediate nodes on a plurality of paths between the mobile node and the correspondent node, recording own available resource information in the query messages; at the correspondent node, receiving the query messages; at the correspondent node, generating a query response message by copying a received query message and transmitting the query response message through the plurality of paths; at the mobile node, receiving the query response message through the plurality of paths, respectively; at the mobile node, selecting a second communication path which transfers a query message having a maximum available resource information after analyzing the available resource information recorded in the query response message; and at the mobile node, transmitting a resource reservation message to the correspondent node through the second communication path.

The method may further include transmitting the first multimedia data traffic and the second multimedia data traffic by using the first communication path and the second communication path at the mobile node and the correspondent node.

In selecting of the second communication path, a query message which arrived at first may be selected when a plurality of query messages having a same maximum available resource information is received.

The method may further include: at the mobile node, assigning a priority to each of the received query response messages by assigning a higher priority to the received query response messages representing a larger amount of available resources; and at the mobile node, selecting at least one additional communication path according to the priority when a maximum available resource amount of the second communication path is smaller that an amount of available resources required by the mobile node.

In the selection of the second communication path, a third communication path may be selected according to the priority when resources are not reserved through the second communication path.

The recording of the own available resource information may include: at the intermediate node, comparing the own available resource information and the available resource information recorded in a query message after analyzing the available resource information recorded in the query message; and at the intermediate node, updating the recorded available resource information to the own available resource information when the intermediate node determines that an amount of own available resources is smaller than the available resources recorded in the available resource information of the query message.

In the transmitting of the query messages, the mobile node may transmit the query messages when the mobile node determines that a data traffic congestion arises on the first communication path.

The method may further include releasing a resource reservation state by transmitting a resource reservation release message to an access router on the first communication path at a crossover node on the second communication path.

In the transmission of the query messages, the mobile node may transmit the query messages when the mobile node determines that available resources on the first communication path are insufficient, and a home agent substitutionary may perform the operations of the correspondent node.

In accordance with a further still another aspect of the present invention, there is a method of reserving resources in a mobile node operated in an IP based mobile network, the method including: at the mobile node, transmitting a query message to a predetermined correspondent node by using a plurality of CoAs (care of addresses) previously stored in the mobile node; at the correspondent node, receiving the query message having available resource information of each path between the mobile node and the correspondent node; at the correspondent node, selecting a communication path having a predetermined amount of available resources by analyzing the available resource information recorded in the query message; and at the correspondent node, transmitting a resource reservation message to the mobile node through the selected communication path.

In accordance with still another aspect of the present invention, there is a method of reserving resources in a mobile node operated in an IP-based mobile network environment, the method including: at the mobile node, transmitting a query message to a predetermined correspondent node by using a plurality of CoAs (care of addresses) previously stored in the mobile node; at the correspondent node, receiving the query message having available resource information of each path between the mobile node and the correspondent node; at the correspondent node, generating a query response message by copying the query message and transmitting the query response message to the mobile node; at the mobile node, selecting a communication path having a predetermined amount of available resources by analyzing the available resource information recorded in the query response message; and at the mobile node, transmitting a resource reservation message to the correspondent node through the selected communication path.

BRIEF DESCRIPTION OF THE DRAWINGS

The above aspects and features of the present invention will become more apparent by describing certain exemplary embodiments of the present invention with reference to the accompanying drawings, in which.

DETAILED DESCRIPTION OF EXEMPLARY EMBODIMENTS OF THE INVENTION

Figure 1:
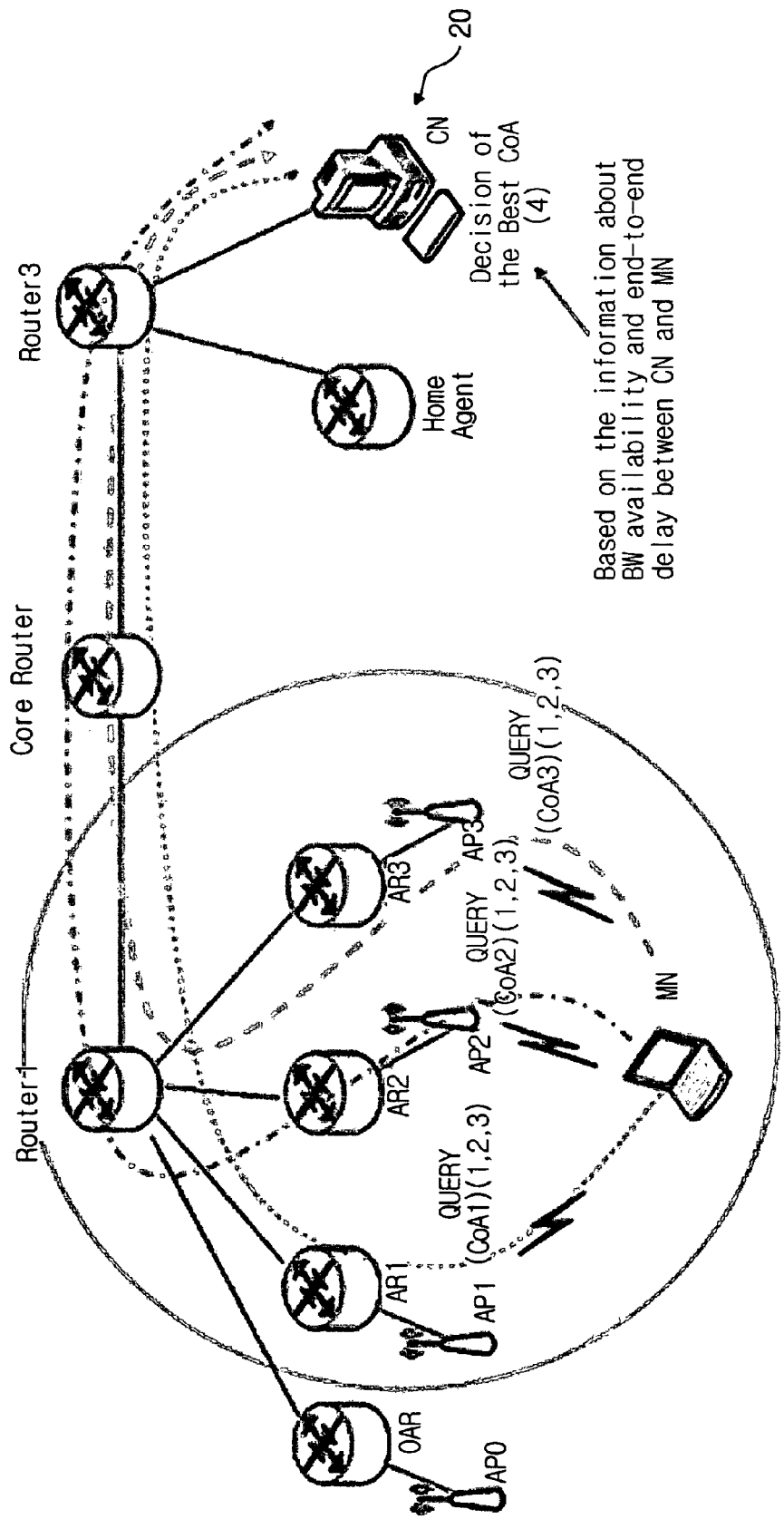
FIGS. 1 and 2 are views illustrating a configuration of a mobile network reserving resources based on a Receiver-initiated scheme according to an exemplary embodiment of the present invention.

Certain exemplary embodiments of the present invention will be described in greater detail with reference to the accompanying drawings.

In the following description, the same drawing reference numerals are used to refer to the same elements even in different drawings. The matters defined in the description such as a detailed construction and elements are merely provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 is a diagram illustrating a configuration of a mobile network reserving resources based on a Receiver_initiated scheme according to an exemplary embodiment of the present invention.

Referring to FIG. 1, the mobile network includes a plurality of access-routers (AR), a plurality of mobile nodes (MN), and a plurality of correspondent nodes (CN). The Receiver_initiated scheme is one method of reserving resources. In the Receiver_initiated scheme, a receiving side transmits a resource reservation message (RESERVE message) to a transmitting side, and the transmitting side transmits an acknowledgement message (ACK message) to the receiving side as a response message to the RESERVE message. That is, a correspondent node transmits a RESERVE message to a mobile node, and the mobile node transmits an ACK message to the correspondent node in order to reserve resources. The transmission of the response message is optional in the Receiver_initiated scheme.

A Sender_initiated scheme is another method of reserving resources. In the Sender_initiated scheme, the transmitting side transmits a RESERVE message to a receiving side and the receiving side transmits a response message to the transmitting side in order to reserve resources. That is, a mobile node transmits a RESERVE message to a correspondent node, and the correspondent node transmits a response message to the mobile node in the Sender_initiated scheme. The Sender_initiated scheme will be explained in greater detail below.

Referring to FIG. 1, the mobile node (MN) performs a handover to an adjacent cell while communicating to a correspondent node through an access router. An access router connected prior to the handover is referred to as an old access router (OAR). When a strength of a signal received from an OAR is reduced lower than a predetermined threshold, or when a strength of signals transmitted from adjacent access routers AR1, AR2 and AR3 increases higher than a predetermined threshold, the mobile node (MN) determines whether a handover is performed or not.

Further, if the current mobile network environment supports multihoming, the MN includes a plurality of care of addresses (CoA). Accordingly, the MN transmits a query message to each of the adjacent access routers AR1, AR2 and AR3 using the plurality of CoAs. That is, the MN generates query messages set to have an origination address of an IPv6 header as care of addresses CoA1, CoA2 and CoA3, and transmits the generated query messages to the adjacent access routers AR1, AR2, and AR3, respectively. The query messages transmitted by the mobile node (MN) are transmitted to AR1, AR2 and AR3 through access points AP1, AP2 and AP3 which are connected to each of the access routers.

Old communication paths formed between the old access router (OAR) and the correspondent node (CN) meet new communication paths formed by AR1, AR2 and AR3 at a predetermined node. Such a predetermined node is a crossover node (CRN). As shown in FIG. 1, a Router 1 is a common crossover node (CRN) of the AR1, AR2 and AR3, but other nodes may become a crossover node for access routers AR1, AR2 and AR3. Additionally, since a path from a CRN to a CN is identical to a path formed before a handover is performed, existing resources are used. To the contrary, since a path from each of the access routers AR1, AR2 and AR3 to each crossover node is newly formed, resources must be reserved.

When the resources are reserved, a query message is used to analyze available resources of each path. That is, each of the access routers AR1, AR2 and AR3 transfers a query message, transmitted from the mobile node, to each of the crossover nodes. When intermediate nodes (not shown) between each access router AR1, AR2 and AR3 and each crossover node receive a query message transmitted from a mobile node, the intermediate nodes record a state of available resources, in the query message.

Further, the crossover node accesses a core network through a predetermined gateway (not shown) and a core router. Also, each query message is transmitted to a correspondent node 20, which accesses the core network through a correspondent access router 3.

When a query message arrives at the correspondent node (CN), the CN selects an optimal path by analyzing information about available resources recorded in each of the received query messages. That is, the CN selects a path formed by intermediate nodes having available resources which satisfy the requirements of the mobile node (MN) among the three communication paths formed by the three access routers AR1, AR2 and AR3 as the optimal path. When a plurality of query messages having the same available resources information which satisfy the requirements of the mobile node (MN) is received, a path which transfers the first query message to arrive is selected as the optimal path.

Figure 2:
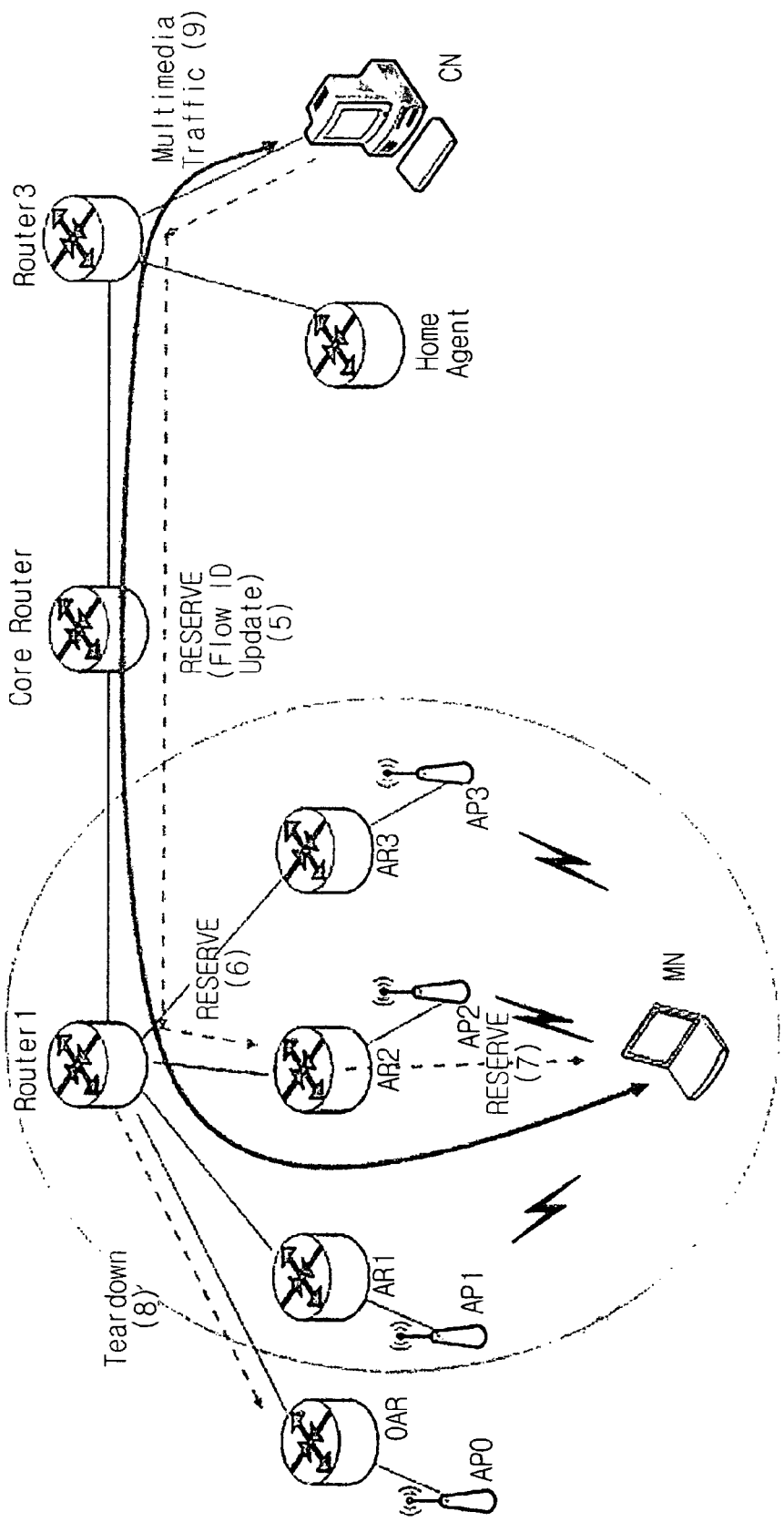

FIG. 2 is a diagram showing resource reservation on an optimal path by transmitting a resource reservation message from a correspondent node that selects the optimal path according to an exemplary embodiment of the present invention.

Referring to FIG. 2, when the CN selects a path using the AR2 as the optimal path, the resource reservation message is transmitted to a CoA of a query message transmitted through AR2. A new flow identifier (ID) using a new CoA by updating an existing reservation state is used between the CN and a CRN. That is, the flow ID is an identifier for identifying a data communication path, which is configured with an IP address of the transmitting side and an IP address of the receiving side. Among the IP addresses, the IP address of the transmitting side is updated to a new CoA. Moreover, resources between the crossover node and the AR2 are newly reserved.

The crossover node releases reserved resources by transmitting a resource release message (Teardown message) to an OAR.

As described above, a mobile node (MN) communicates with a correspondent node (CN) by selecting an optimal path having available resources which satisfy the mobile node (MN) in a multihoming environment providing a plurality of communication paths between the mobile node (MN) and the correspondent node (CN).

Figure 3:
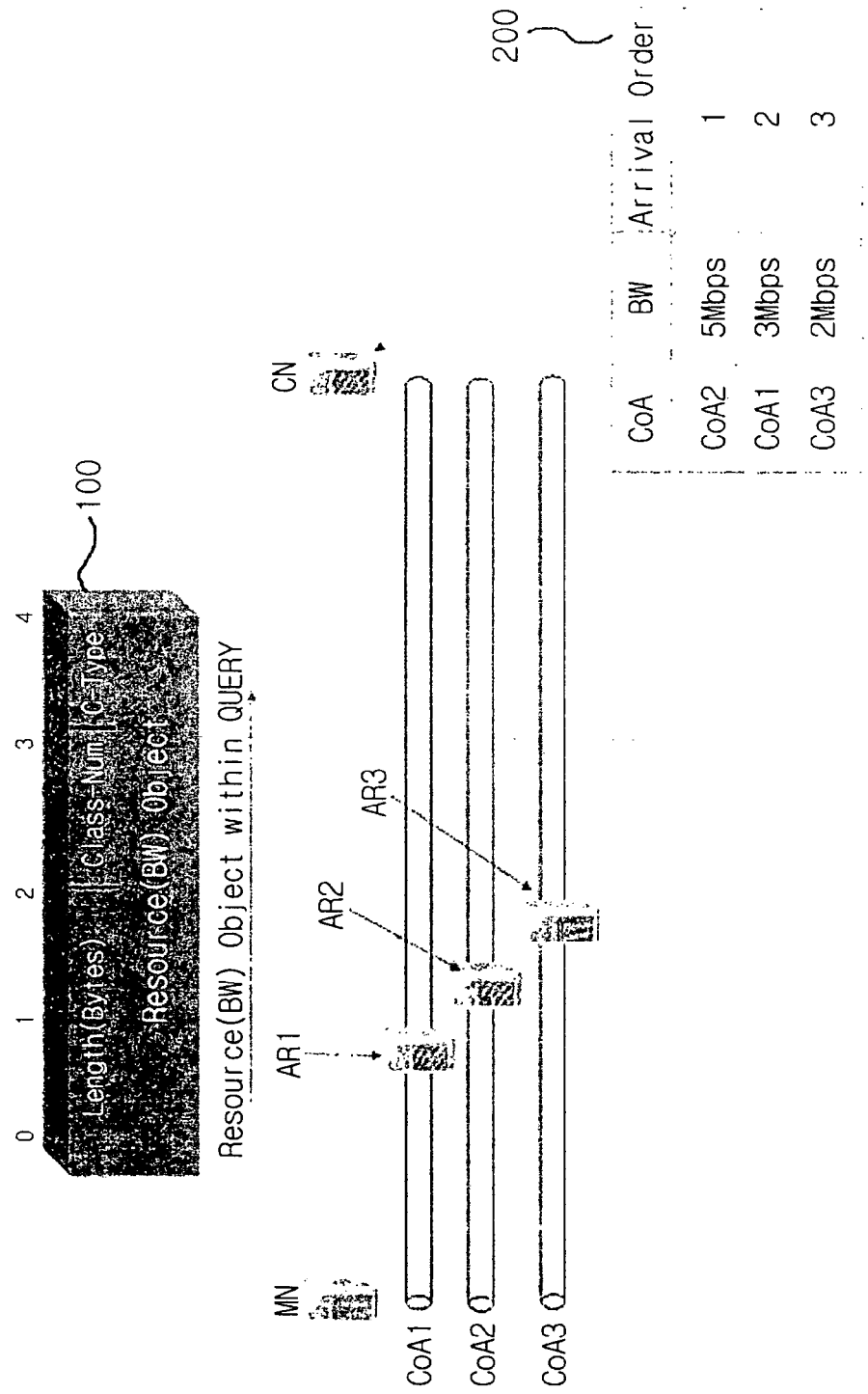
FIG. 3 shows the transmission of query message using a plurality of CoAs according to an exemplary embodiment of the present invention.

FIG. 3 is a diagram showing the transmission of a query message using a plurality of CoAs according to an exemplary embodiment of the present invention.

Referring to FIG. 3, a mobile node (MN) transmits query messages 100 to each of the access routers AR1, AR2 and AR3 using CoA1, CoA2 and CoA3. Each of the query messages 100 includes a resource (BW) object field in order to record information regarding available resources.

Intermediate nodes between each of the access routers AR1, AR2 and AR3 and the crossover node record available resource information in the resource (BW) object field of the query message 100. When an intermediate node records available resource information, the intermediate node compares its own available resource information and a previous intermediate node's available resource information. If the intermediate node's own available resource information is smaller than the previous intermediate node's available resource information, the resource (BW) object field is updated. Although a number of intermediate nodes provide wider bandwidths than others, the resource (BW) object field is updated by a certain intermediate node having limited bandwidth. That is, the resource (BW) object field contains the limited bandwidth as the bandwidth of the entire communication path. It is preferable, but not necessary, to inform the bandwidth of the entire communication path to the correspondent node (CN) by recording an intermediate node having the minimum available resource information in the query message. The crossover node transmits the query messages received through each of the intermediate nodes to the correspondent node (CN).

The CN builds a database using the CoAs and available resource information in the received query messages. The CN assigns priorities to the received query messages according to the available resource information in the query message. That is, a higher priority is assigned to a query message indicating a wider bandwidth. As shown in FIG. 3, since the available resources of CoA2 is the largest, i.e., 5 Mbps, the highest priority is assigned to the query message of the CoA2. The arriving order of the query messages is also recorded in the database built by the CN. When a plurality of query messages having identical available resource information is received, the CN selects a CoA of the query message which arrived first.

A mobile node may record a requested amount of available resources to be used in each query message in order to inform a corresponding node of the mobile node's requested amount of available resources. The correspondent node may select a plurality of CoAs when the correspondent node determines that the available resource information recorded in each of the query messages is smaller than the resources requested by the mobile node. That is, the correspondent node reserves additional resources by selecting a path having the second largest available resources in addition to the path having the largest available resources. Therefore, the mobile node and the correspondent node can transmit/receive multimedia data by using two communication paths.

As described above, the correspondent node performs the selection of the CoAs and the transmission of the resource reservation message in the present exemplary embodiment. However, consistent with the present invention, a home agent may perform operations to select the CoAs and to transmit the resource reservation message instead of the corresponding node.

Figure 4:
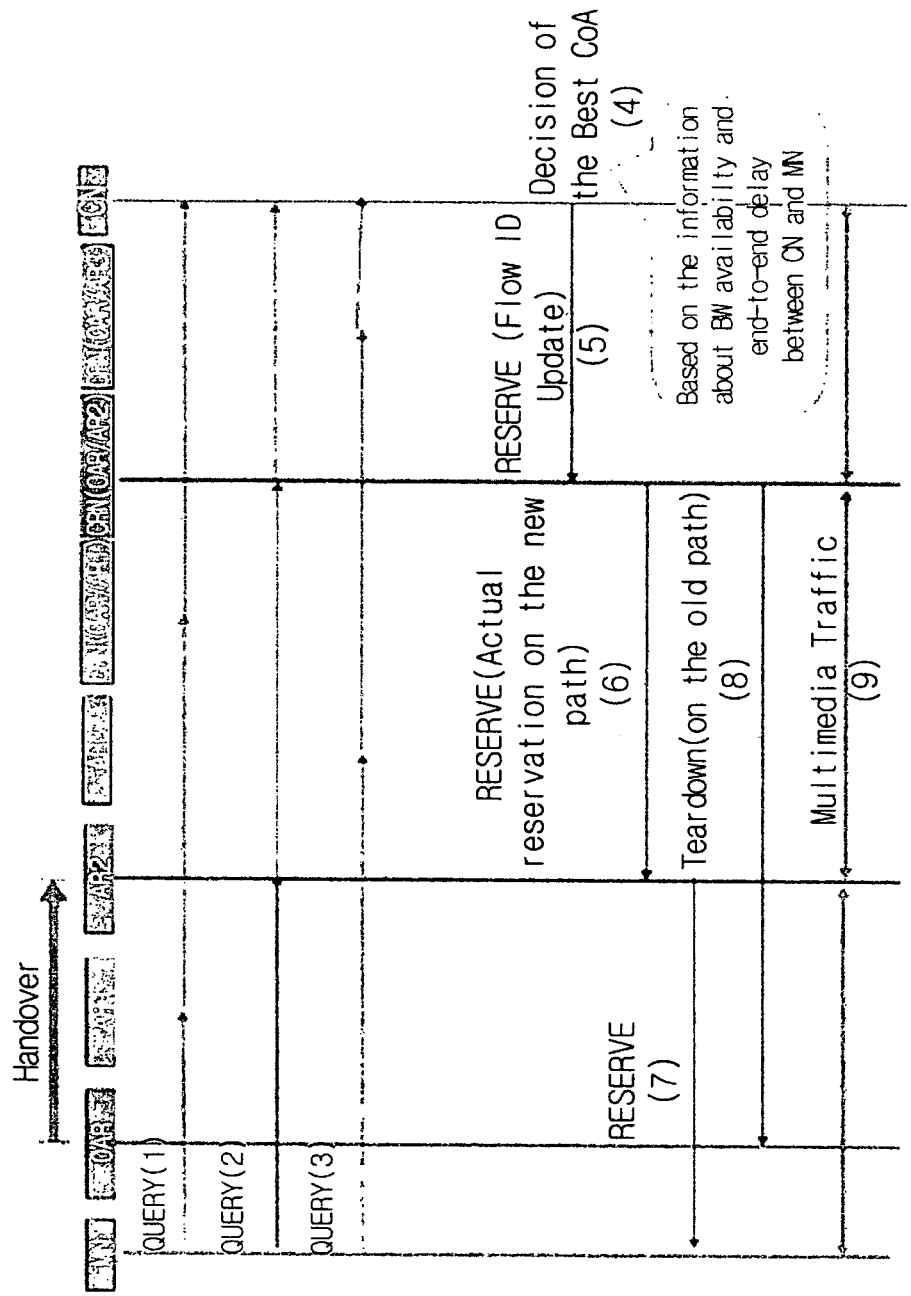
FIG. 4 is a diagram for explaining resource reservation based on a Receiver_initiated scheme according to an exemplary embodiment of the present invention.

FIG. 4 is a diagram for explaining resource reservation based on a Receiver_initiated scheme according to an exemplary embodiment of the present invention.

Referring to FIG. 4, a mobile node (MN) transmits query messages 1, 2 and 3 to access routers AR1, AR2 and AR3, respectively. Each of these query messages is transmitted to a correspondent node through a crossover node. The crossover node is a node where a communication path using an old access router meets a new communication path. Accordingly, there may be multiple existing crossover nodes, such as a CRN (OAR/AR1) which is a merging point between the OAR and the AR1, a CRN (OAR/AR2) which is a merging point between the OAR and the AR2, and a CRN (OAR/AR3) which is a merging point between the OAR and the AR3.

The correspondent node (CN) selects an optimal communication path using available resource information recorded in each of the query messages. That is, the correspondent node (CN) selects an optimal CoA. The correspondent node transmits a resource reservation message through a path transferring the query message which has the optimal CoA. For example, when the CoA2 is selected as the optimal CoA, a resource reservation message is transmitted through a path formed with the CRN (OAR/AR2) and the AR2 through which the query message having CoA2 travels. Further, the CRN (OAR/AR2) transmits a resource release message (Teardown message) to the old access router (OAR) to release reserved resources. As described above, the mobile node (MN) transmits/receives multimedia data traffic through a path formed with the AR2 and the CRN (OAR/AR2) by using the CoA2.

Figure 5:
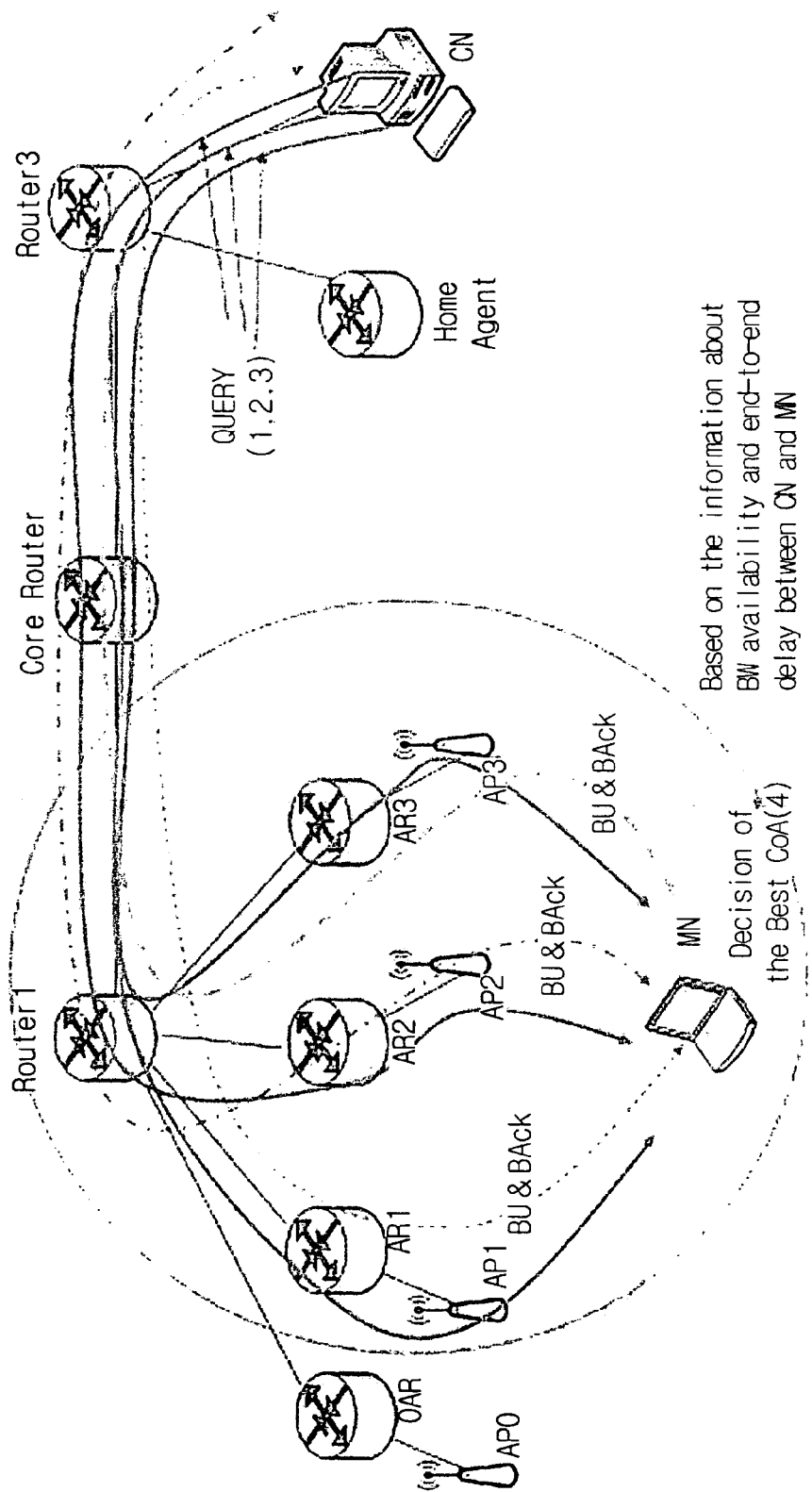
FIGS. 5 and 6 are views illustrating a configuration of a mobile network reserving resources based on a Sender_initiated scheme according to an exemplary embodiment of the present invention.

FIG. 5 is a diagram showing a configuration of a mobile network reserving resources based on a Sender_initiated scheme according to an exemplary embodiment of the present invention.

Referring to FIG. 5, a mobile node (MN) performing a handover transmits a binding process message to a correspondent node (CN) using a plurality of CoAs. The binding process message is a message which informs a mobile node's CoA to a correspondent node or a home agent. The mobile node (MN) periodically transmits the binding process message to update a binding state that matches a CoA registered at a home agent and a home address of the mobile node (MN).

A correspondent node (CN) transmits a binding acknowledgement message to the mobile node (MN) in response to the binding process message from the mobile node (MN).

The correspondent node (CN) transmits a plurality of query messages using a CoA confirmed by the binding process message. Accordingly, the plurality of query messages are transmitted to crossover nodes of each of the adjacent access routers AR1, AR2 and AR3 of the mobile node (MN). Each of the crossover nodes transfers the query messages to each of the access routers AR1, AR2 and AR3. Intermediate nodes between the crossover nodes and the access routers record available resource information in the query messages.

The mobile node (MN) selects a path having the optimal available resources by analyzing available resource information included in the query messages received through each of the access routers AR1, AR2, and AR3. The selection method of the optimal path is, for example, identical to the above described selection method of the Receiver_initiated scheme.

Figure 6:
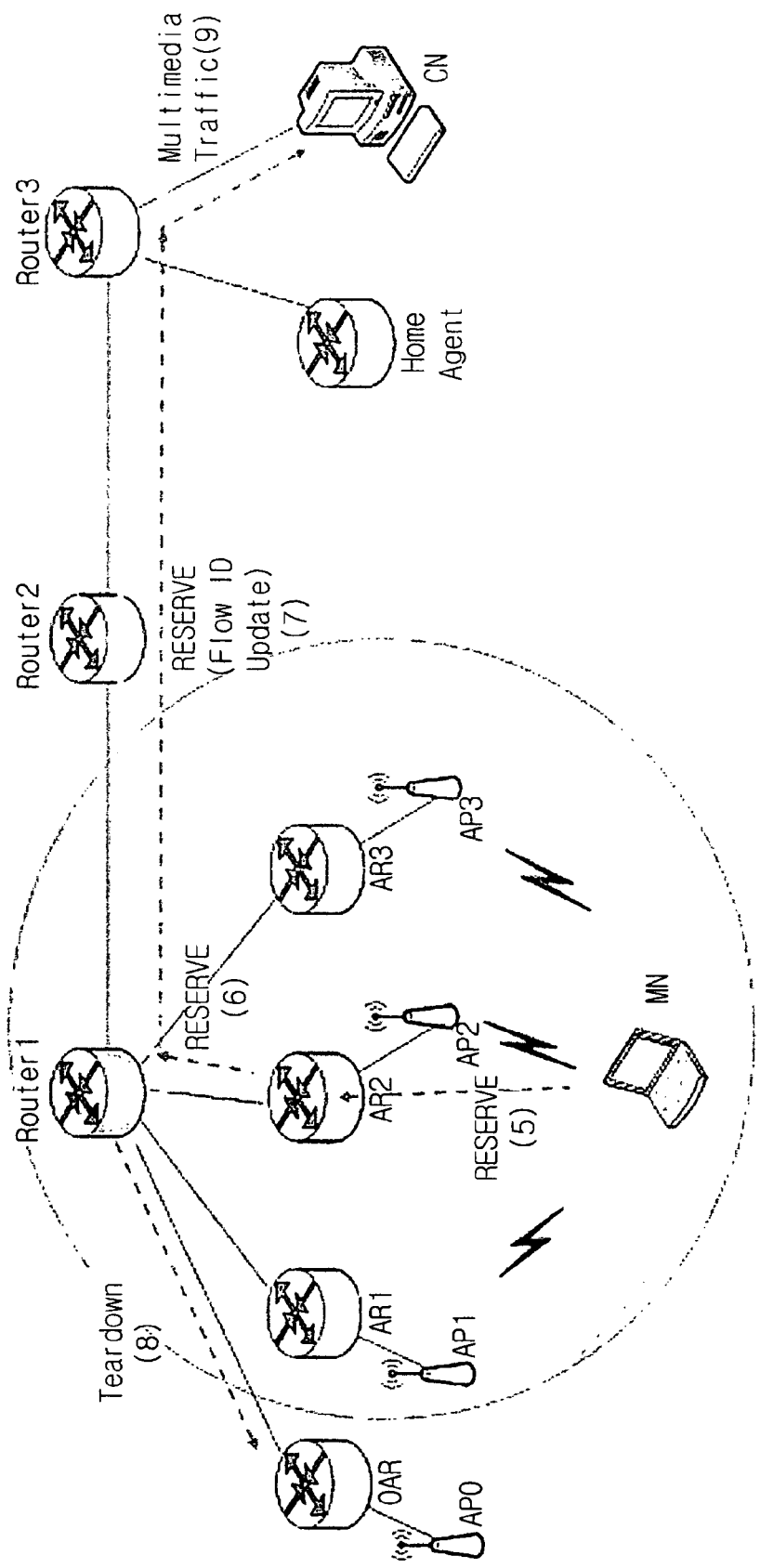

FIG. 6 is a diagram showing the transmission of a resource reservation message through a path which transfers an optimal query message according to an exemplary embodiment of the present invention.

Referring to FIG. 6, a mobile node (MN) selects a path including an access Router 2 (AR2) and transmits a resource reservation message through the AR2. The resource reservation message is transmitted to a correspondent node (CN) through the AR2 and a Router 1 (i.e., a crossover node). Accordingly, resources on a path between the AR2 and the Router 1 are newly reserved, and an existing resource reservation state is updated to a new flow ID using the CoA2 on a path between the Router 1 and the correspondent node (CN).

As described above, the mobile node (MN) may additionally select a secondary communication path when an amount of resources required by the mobile node (MN) is not satisfied. Accordingly, resources of a plurality of communication paths may be reserved.

Figure 7:
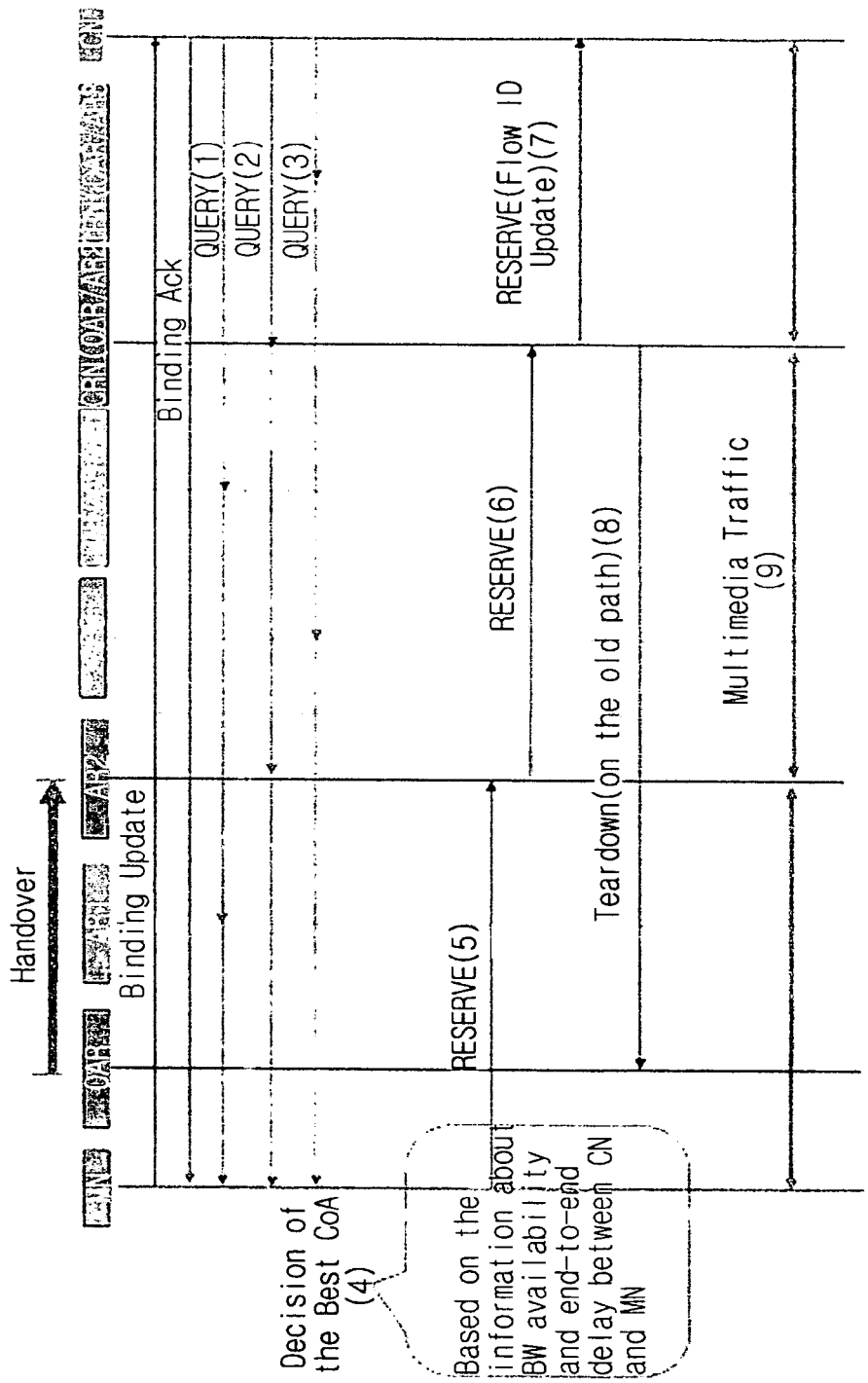
FIG. 7 is a diagram illustrating a reservation of resources based on a Sender_initiated scheme according to an exemplary embodiment of the present invention.

FIG. 7 is a diagram illustrating a reservation of resources based on a Sender_initiated scheme according to an exemplary embodiment of the present invention.

Referring to FIG. 7, a mobile node (MN) transmits a binding update message to a correspondent node (CN) to provide the correspondent node (CN) with CoA information. The CN transmits a plurality of query messages 1, 2 and 3 through a path which transfers the binding update message, after transmitting a binding acknowledgement message.

The mobile node (MN) receives the query messages 1, 2 and 3 and selects an optimal CoA. If a path including an AR2 and a CRN (OAR/AR2) is selected, as shown in FIG. 7, the mobile node (MN) transmits a resource reservation message to the CRN (OAR/AR2). The CRN (OAR/AR2) then transmits the resource release message to the old access router (OAR), and reserved resources on the old communication path are released. As a result, the mobile node (MN) and the correspondent node (CN) transmit/receive multimedia data traffic using the AR2 and the CRN (OAR/AR2).

Figure 8:
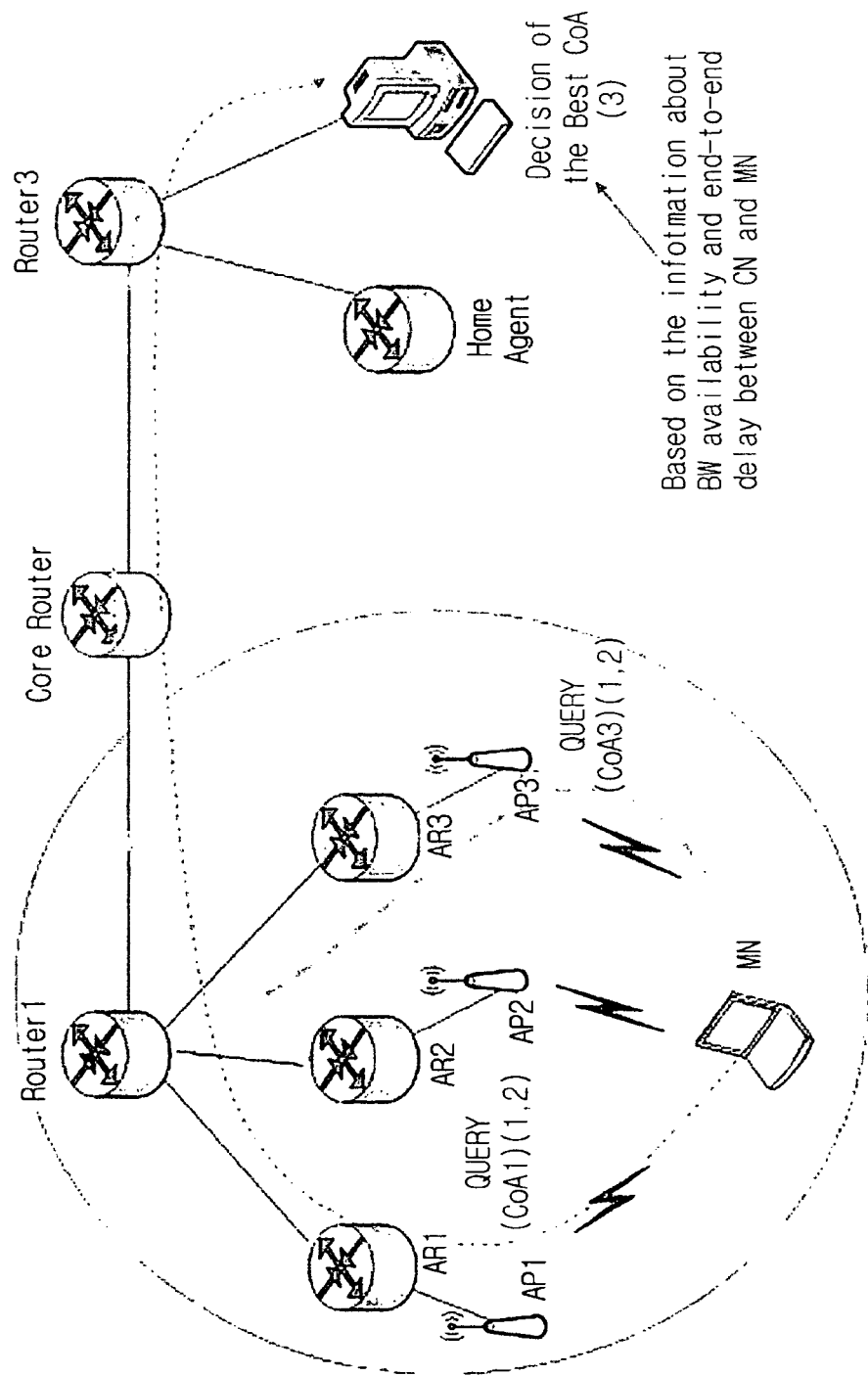
FIGS. 8 and 9 are views showing a mobile network environment dispersing data traffic load on a communication path based on a Receiver_initiated scheme according to an exemplary embodiment of the present invention.

FIG. 8 is a diagram showing a mobile network environment dispersing a data traffic load on a communication path based on a Receiver_initiated scheme according to an exemplary embodiment of the present invention.

Referring to FIG. 8, when a supplementary application is performed on a mobile node (MN) communicating with a correspondent node (CN) through a first communication path including an AR2, the mobile node (MN) must open a communication session between the mobile node (MN) and the correspondent node (CN). The first communication path may have insufficient resources because many of its resources are already allocated to an existing session. Accordingly, it is preferable, but not necessary, to open a new session on a communication path using another CoA in order to disperse the load of the first communication path.

In order to open a new session, the mobile node (MN) transmits query messages to adjacent routers AR1 and AR3 using a CoA1 and a CoA3. Further, intermediate nodes between the AR1 and a crossover node, and between the AR3 and a crossover node, record available resource information in the query messages.

Figure 9:
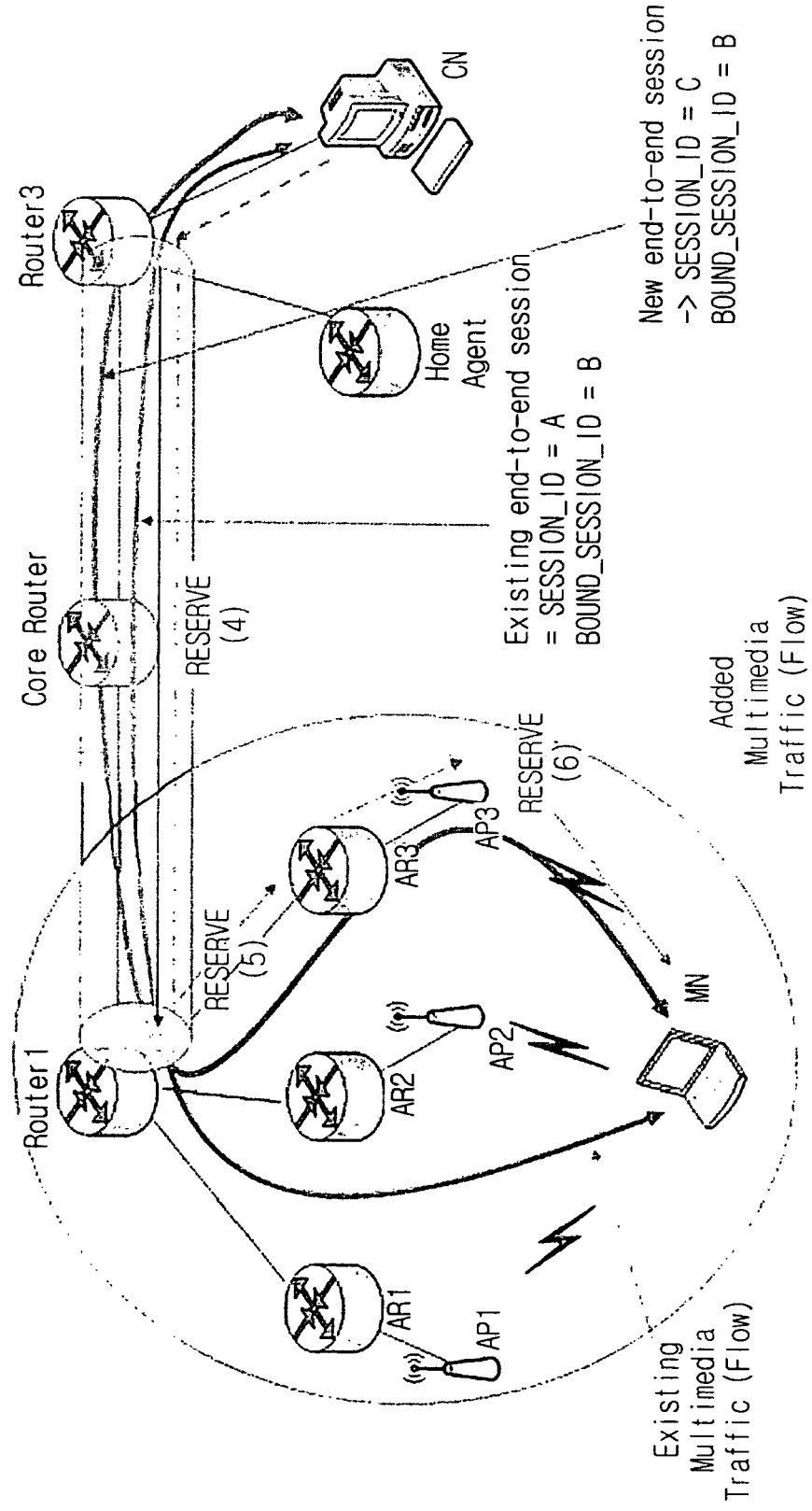

FIG. 9 is a diagram showing the reservation of resources by selecting an optimal path at a correspondent node (CN) in the mobile network environment shown in FIG. 8.

When a correspondent node (CN) selects a query message transmitted through the AR3 as an optimal query message, the correspondent node transmits a resource reservation message through a path having the AR3. Accordingly, a second communication path is reserved in addition to the first communication path.

The mobile node (MN) and the correspondent node (CN) can transmit/receive multimedia data traffic through both of the first and the second communication paths. A crossover node of the first and the second communication paths integrates a first flow and a second flow, each of which is transmitted through the first and the second communication paths, respectively. Accordingly, a new integrated session ID is assigned to the integrated flow. That is, if a session ID of the first flow is "A" and a session ID of the second flow is "C", the integrated multimedia data traffic is transmitted using an integrated session ID "B." The session ID is an identifier for identifying a corresponding session until one session has ended.

Figure 10:
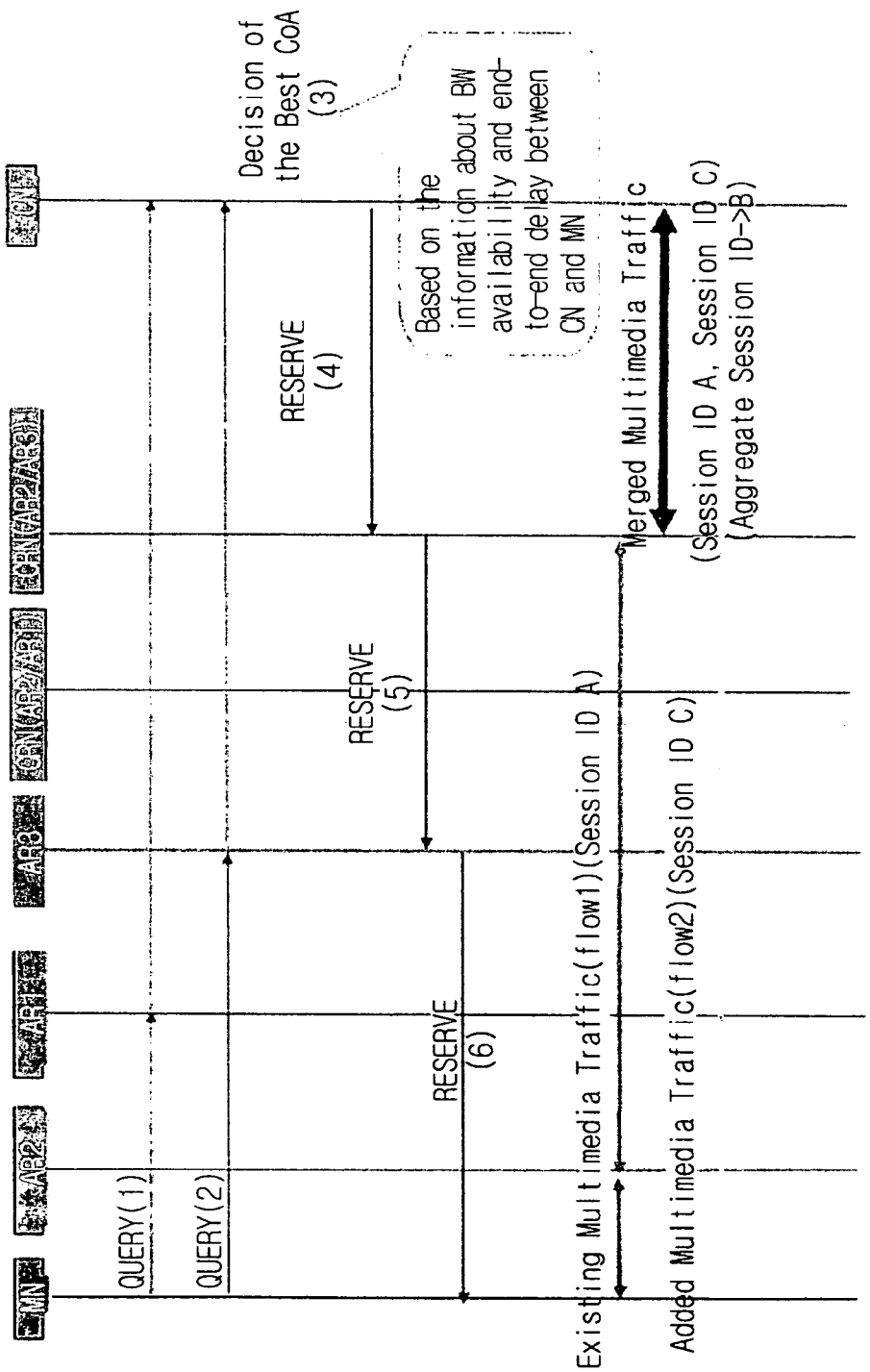
FIG. 10 is a flowchart showing a load dispersion on a communication path based on a Receiver_initiated scheme according to an exemplary embodiment of the present invention.

FIG. 10 is a flowchart showing a load dispersion on a communication path based on a Receiver_initiated scheme according to an exemplary embodiment of the present invention.

Referring to FIG. 10, a mobile node (MN) which communicates using a first communication path transmits query messages to adjacent access routers AR1 and AR3, and each of the query messages is transmitted to the correspondent node through an intermediate node and a crossover node. A second communication path is newly reserved by transmitting a resource reservation message after selecting an optimal path at the correspondent node. As a result, multimedia data traffic is transmitted or received through both the first communication path and the second communication path. A crossover node (AR2, AR3), where the first and the second communication paths are met, integrates the first flow and the second flow to transmit integrated multimedia data traffic having a new integrated session ID "B."

Figure 11:
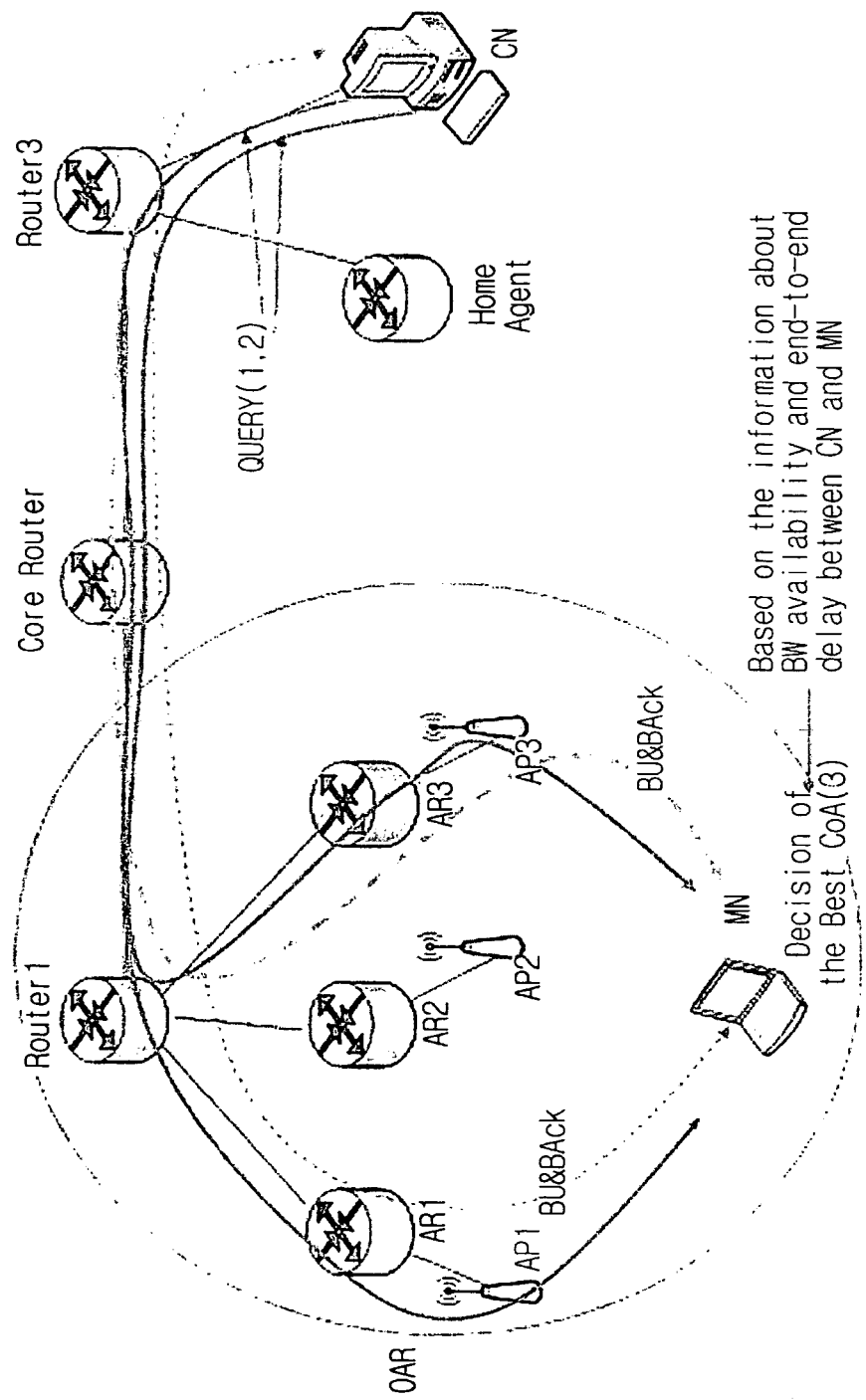
FIGS. 11 and 12 are views showing a configuration of a mobile network environment dispersing a data traffic load on a communication path based on a Sender_initiated scheme according to an exemplary embodiment of the present invention.

FIG. 11 is a diagram showing a configuration of a mobile network environment dispersing a data traffic load on a communication path based on a Sender_initiated scheme according to an exemplary embodiment of the present invention.

Referring to FIG. 11, a mobile node (MN), communicating with a correspondent node (CN) through a first communication path having an AR2, transmits query messages to adjacent access routers AR1 and AR3 using a CoA1 and a CoA3. Intermediate nodes between the AR1 and a crossover node, which is a Router 1 as shown in FIG. 11, and between the AR3 and the crossover node, record available resource information in the query messages. The mobile node (MN) may request a query response message from a correspondent node (CN) using an option field requiring a response to a query message. When the correspondent node (CN) receives the query message, the correspondent node (CN) checks the option field. If the mobile node (MN) has requested a query response message, the correspondent node (CN) generates the query response message by copying the query message. The correspondent node (CN) transmits the generated query response message through a path which transfers the query response message to the mobile node (MN). The mobile node (MN) then selects an optimal path based on the query response messages received through the AR1 and the AR3.

Figure 12:
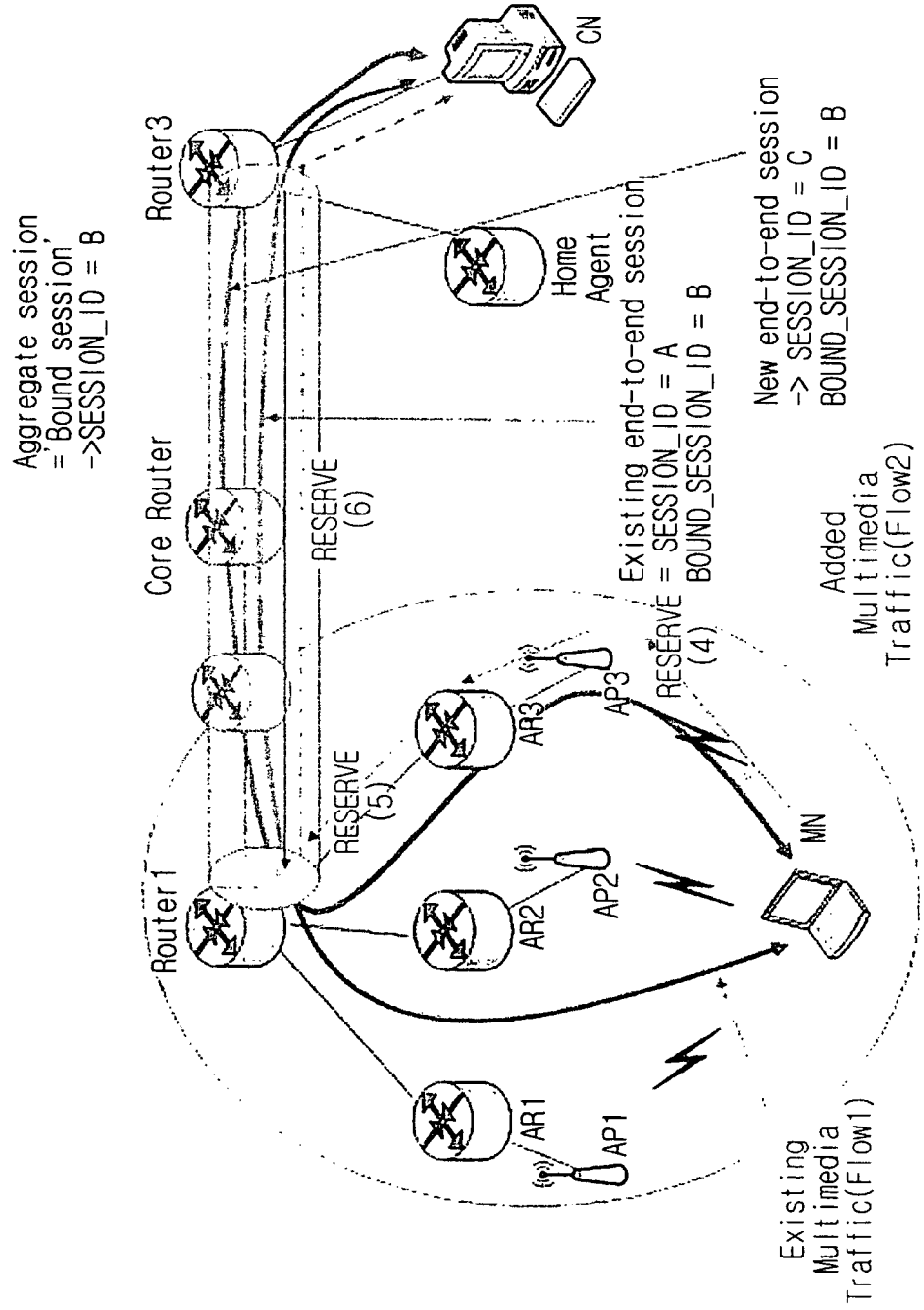

FIG. 12 is a diagram illustrating a resource reservation by selecting an optimal path at a mobile node in the mobile network environment shown in FIG. 11.

Referring to FIG. 12, when a mobile node (MN) determines that available resource information recorded in a query response message transmitted through the AR3 is an optimal state, the mobile node (MN) transmits a resource reservation message through a path having the AR3. Accordingly, a second communication path is reserved as a secondary communication path in addition to the first communication path. As with the Receiver_initiated scheme, multimedia data traffic is integrated as multimedia traffic having an integrated session ID "B" between a crossover node (AR2/AR3) to a correspondent node (CN) for transmitting.

Figure 13:
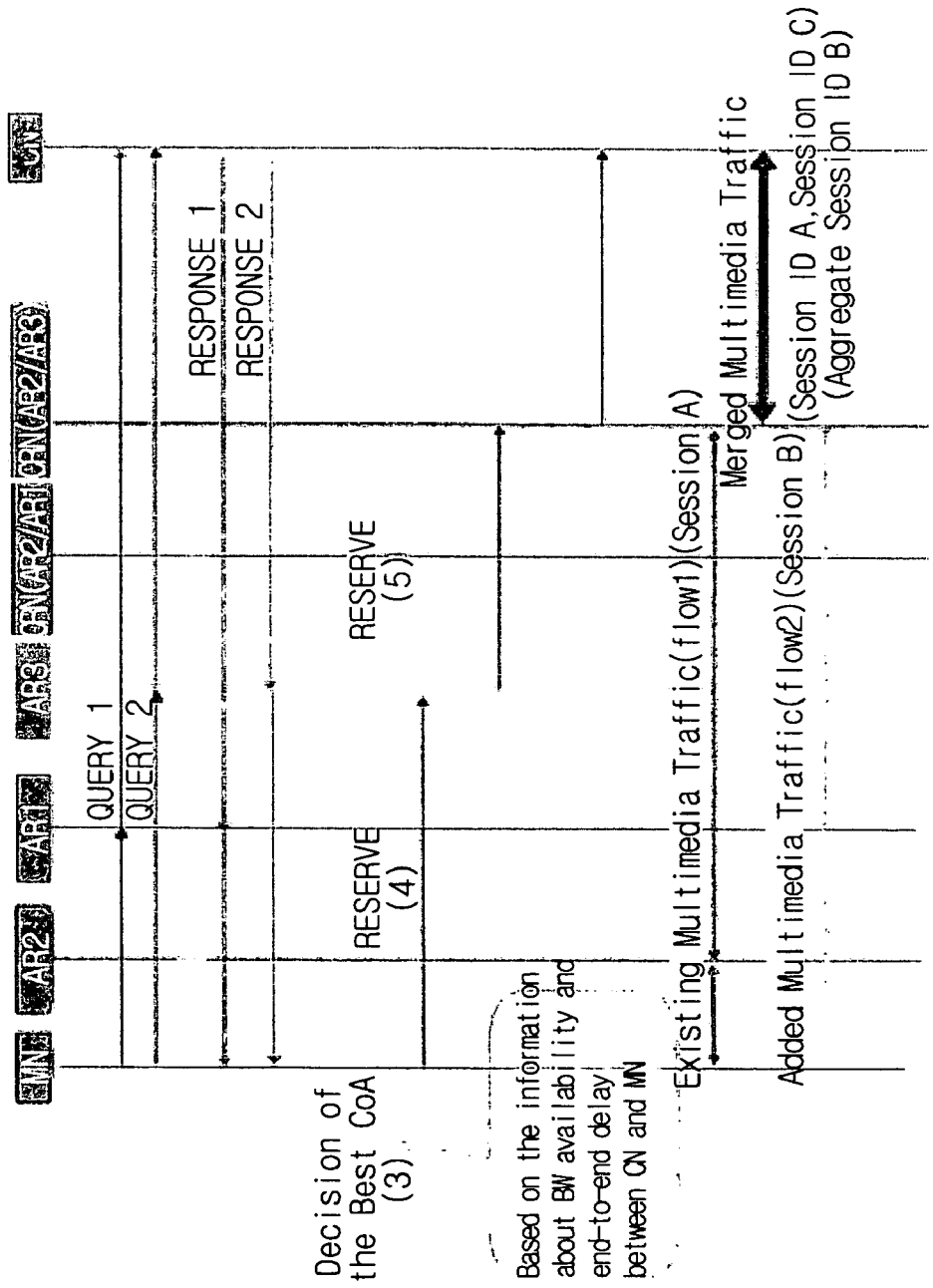
FIG. 13 is a diagram showing a load dispersion on a communication path based on a Sender_initiated scheme according an exemplary embodiment of the present invention.

FIG. 13 is a flowchart showing a load dispersion on a communication path based on a Sender_initiated scheme according an exemplary embodiment of the present invention.

Referring to FIG. 13, a correspondent node (CN) selects an optimal path and confirms a CoA of a corresponding mobile node (MN) by receiving a query message. Accordingly, the correspondent node (CN) transmits a query response message, and a mobile node (MN) selects an optimal CoA. As a result, the selected CoA is used to transmit a resource reservation message. That is, a CoA3 is used to transmit the resource reservation message through a path having the AR3 and the CRN (AR2/AR3). Thus, a second communication path is newly established in addition to the first communication path.

As described above, FIGS. 8, 9, 10, 11, 12 and 13 show exemplary embodiments of methods of dispersing a load on an existing communication path in the case of adding a communication session. Besides such exemplary embodiments, available resources may become insufficient when congestion of data traffic arises on the existing communication path or when the existing communication path is used by another mobile node. That is, a mobile node may transmit query messages to adjacent access routers using all of its own CoAs when congestion of data traffic arises or when the available resources become insufficient. Also, a correspondent node may transmit a query response message in response to the query message. Since detailed operations of both of the aforementioned cases are identical to exemplary embodiments described with FIGS. 8, 9, 10, 11, 12 and 13, drawings and explanation are omitted. However, an integrated session ID is not required to be assigned because a new integrated session is not opened. Since an existing communication path cannot be used by the congestion of data traffic, query messages are transmitted through all of the interfaces AR1, AR2 and AR3 including an access router (AR2) of an existing communication path, as shown in FIGS. 14 and 15.

Figure 14:
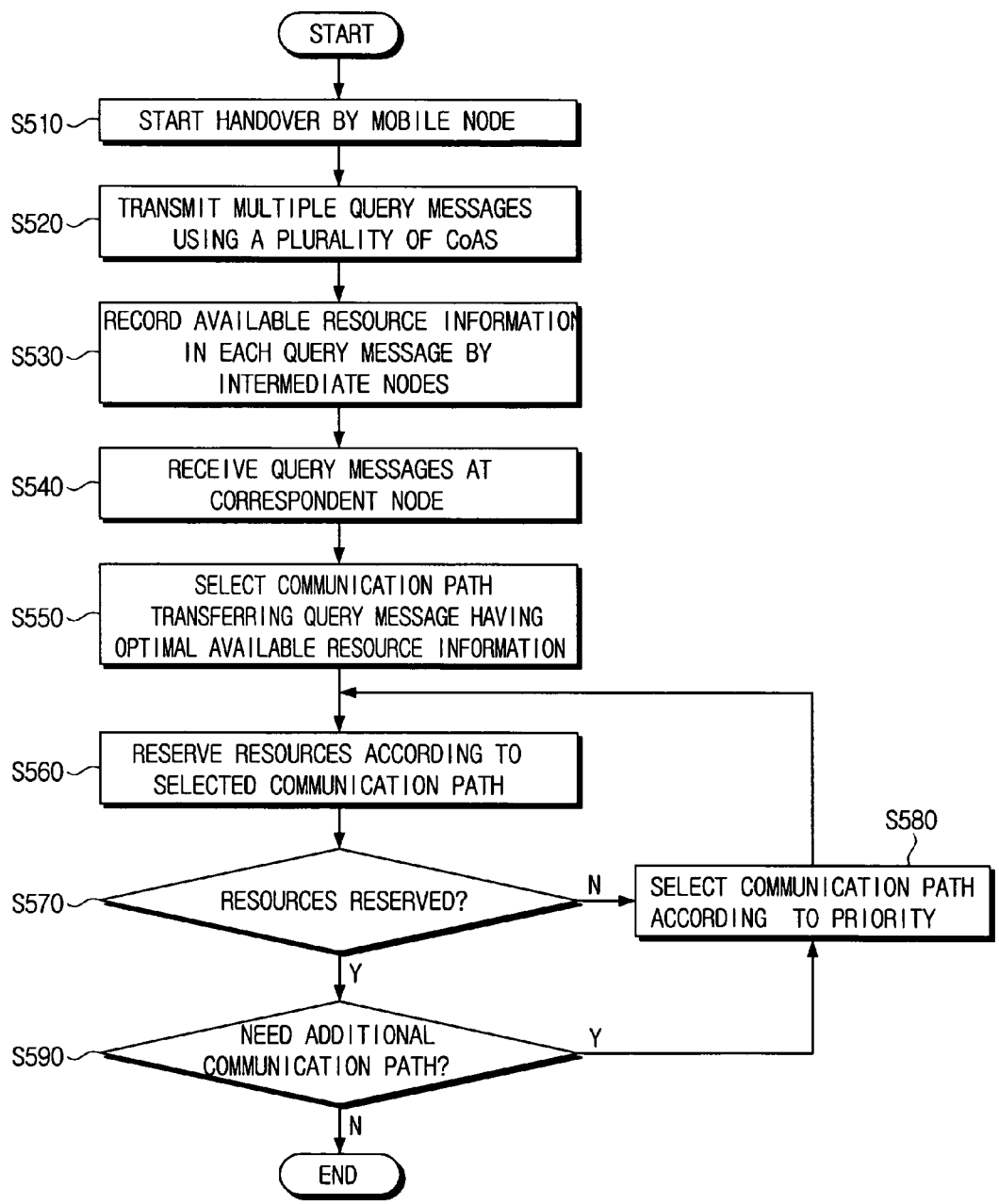
FIG. 14 is a flowchart of a resource reservation method based on a Receiver_initiated scheme according to an exemplary embodiment of the present invention.
Figure 15:
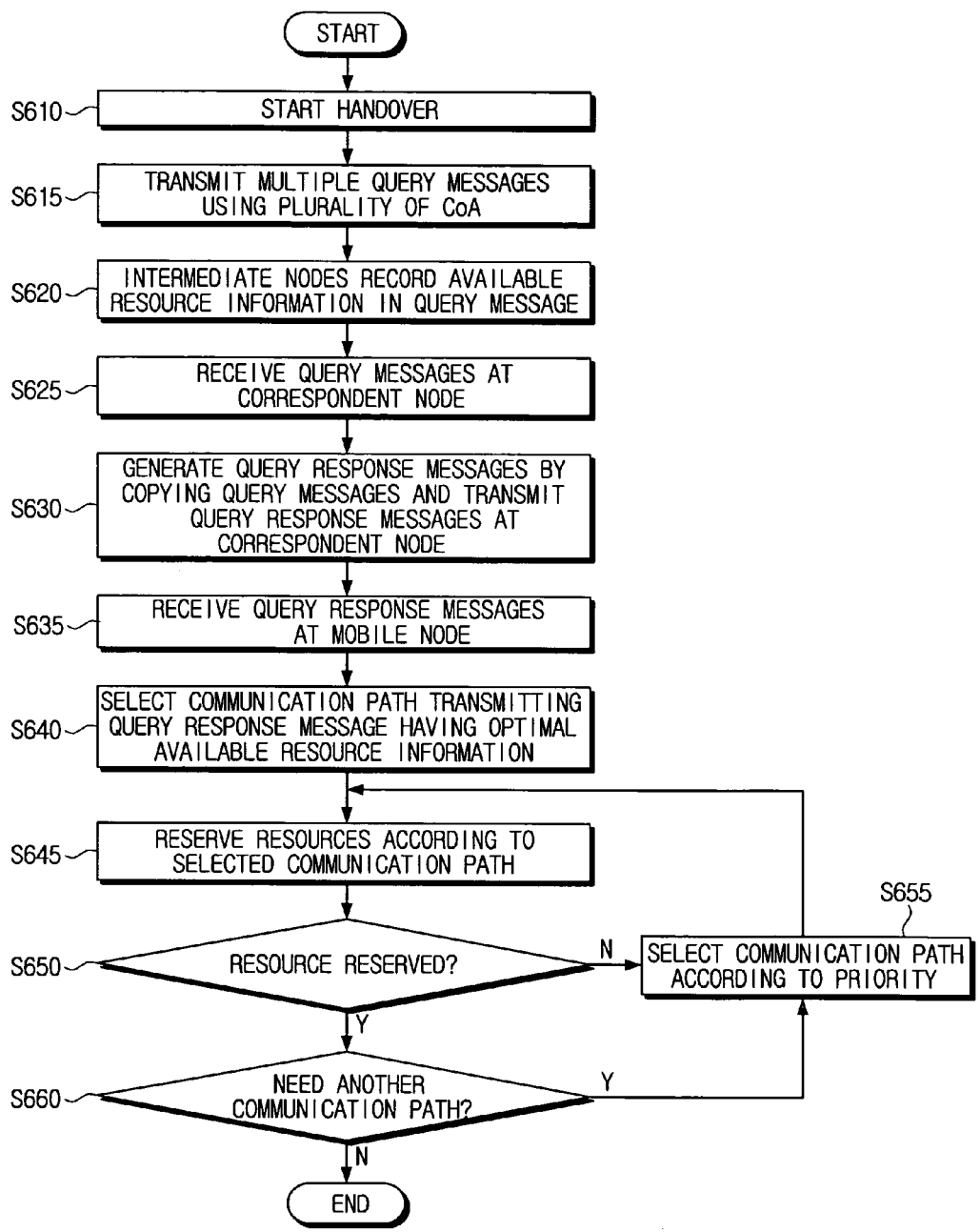
FIG. 15 is a flowchart showing a resource reservation method based on a Sender_initiated scheme according an exemplary embodiment of the present invention.

FIG. 14 is a flowchart of a resource reservation method based on a Receiver_initiated scheme according to an exemplary embodiment of the present invention.

Referring to FIG. 14, when a mobile node starts a handover in operation S510, the mobile node transmits a plurality of query messages to adjacent access routers using a plurality of CoAs in operation S520.

Each access router transmits the query messages to a crossover node, and intermediate nodes between each access router and crossover node record available resource information in the query message in operation S530. When the query message finally arrives at a correspondent node in operation S540, the correspondent node analyzes the available resource information recorded in the query message and selects an optimal path in operation S550. The correspondent node assigns a priority to each of the query messages according to an amount of available resources of a path transferring the query message and an arriving order of the query messages.

The correspondent node reserves resources by transmitting a resource reservation message using a CoA of the selected path in operation S560.

The mobile node may transmit a predetermined response message in response to the resource reservation message. When the correspondent node determines the failure of a resource reservation, if, for instance, a response message does not arrive for a predetermined time, the correspondent node transmits another resource reservation message by selecting a path according to a priority in operations S570 and S580. That is, for example, the correspondent node selects a path having the second largest available resources among paths satisfying the mobile node's requested available resources.

If the correspondent node determines that a selected path does not satisfy the available resources requested by the mobile node in operation S590, then the correspondent node additionally selects a supplementary path according to the priority in operation S580. Accordingly, the correspondent node reserves resources on a plurality of communication paths.

FIG. 15 is a flowchart showing a resource reservation method based on a Sender_initiated scheme according an exemplary embodiment of the present invention.

Referring to FIG. 15, when a mobile node starts a handover in operation S610, the mobile node transmits query messages by using a plurality of CoAs in operation S615. Intermediate nodes between the mobile node and a correspondent node record available resource information in each of the query messages in operation S620.

When the correspondent node receives the query messages in operation S625, the correspondent node determines whether a transmission of a query response message is to be performed by analyzing an option field of the received query messages. If the correspondent node determines to transmit the query response message, the correspondent node generates a query response message by copying the query message, and transmits the generated query response message to the mobile node in operation S630.

When the mobile node receives the query response message in operation S635, the mobile node selects a communication path having optimal available resources in operation S640.

Accordingly, resources are reserved by transmitting a resource reservation message through the selected path in operation S645. As described above in FIG. 14, if the reservation of resources fails in operation S650, the resources may be reserved by selecting a communication path having a next highest priority in operation S655.

Also, if the selected communication path has insufficient available resources in operation S660, additional resources may be reserved by selecting an additional communication path in operation S655. The resource reservation as shown in FIGS. 14 and 15 can also be executed when the mobile node detects traffic congestion.

Moreover, a home agent may perform the operations of the correspondent node as described in the above exemplary embodiment. That is, the home agent may transmit or receive the query message. Also, the home agent may select an optimal path by analyzing the available resources information of the query message and transmit the resource reservation message through the selected path.

Besides performing a handover, the reservation of resources is required when traffic congestion occurs on an existing communication path, when available resources on the existing communication path becomes insufficient or when a new application is performed. It is preferable, but not necessary, to disperse loads on the existing communication path by using a query message. A method of load dispersion may be varied according to the Receiver_initiated scheme and the Sender_initiated scheme. Since detailed load dispersing methods are already described with reference to FIGS. 8, 9, 10, 11, 12 and 13, the detailed explanation thereof is omitted.

As described above, resources are reserved by using multihoming characteristics of a mobile node according to exemplary embodiments of the present invention. Accordingly, when a mobile node performs a handover, resources are reserved by using a wireless network having sufficient available resources among adjacent wireless networks. Also, when the resources of a currently connected communication path become insufficient, or when a traffic congestion arises on the currently connected communication path, a communication path is changed or a secondary communication path is reserved and used by selecting another wireless network having sufficient available resources among adjacent wireless networks. As a result, the traffic load on the current communication path is dispersed to the secondary communication path.

The foregoing exemplary embodiments and advantages are merely exemplary and are not to be construed as limiting the present invention. The present teachings can be readily applied to other types of apparatuses. Also, the description of the exemplary embodiments of the present invention is intended to be illustrative, and not to limit the scope of the claims, and many alternatives, modifications, and variations will be apparent to those skilled in the art without departing from the spirit and scope of the embodiments of the present invention as defined in the following claims.

What is claimed is:

1. A method of reserving resources in an IP-based mobile network environment including a mobile node which performs a handover, the method comprising:

transmitting query messages from the mobile node to a plurality of adjacent access routers using a plurality of CoAs (care of address);

transmitting the query messages from the plurality of adjacent access routers to a crossover node;

recording available resource information in the query messages by at least one intermediate node located between the plurality of adjacent access routers and the crossover node on each of a plurality of communication paths, while the query messages are transmitted to a correspondent node;

receiving, from the crossover node, the query messages comprising available resource information of each of the communication paths at the correspondent node;

analyzing the available resource information recorded in the received query messages at the correspondent node;

selecting a first communication path, from the plurality of communication paths which transferred a query message, that provides available resources required by the mobile node, as a selected communication path; and transmitting a resource reservation message from the correspondent node to the mobile node through the selected communication path, wherein, the recording step comprises, receiving the query messages at the at least one intermediate node on each of a plurality of communication paths;

comparing own available resource information of the intermediate node and pre-recorded resource information in the query message, if there is a recorded resource information in the query message, and if not, recording the own available resource information;

updating the pre-recorded resource information with the own available resource information as the available resource information, if the own available resource information is smaller than the pre-recorded resource information, otherwise maintaining the pre-recorded resource information; and transmitting the query message comprising the updated or maintained available resource information toward the correspondent node.

2. The method of claim 1, wherein when a plurality of query messages having available resource information indicative of available resources required by the mobile node is received, the correspondent node selects, as the selected communication path, a communication path that transferred a query message which arrived first.

3. The method of claim 1, further comprising:

assigning a priority at the correspondent node to each of the received query messages by assigning a higher priority to a query message having available resource information indicating a larger amount of available resources; and selecting a second communication path according to the assigned priority when resources through the first communication path, are not reserved.

4. The method of claim 3, wherein when it is determined in analyzing the recorded available resource information, that a maximum amount of the available resources of the selected communication path is smaller than an amount of available resources required by the mobile node, the correspondent node selects at least one additional communication path according to the assigned priority.

5. The method of claim 1, further comprising releasing a resource reservation state by transmitting a resource reservation release message to an old access router of the mobile node from a crossover node at which an old communication path meets the selected communication path.

6. The method of claim 1, wherein a home agent substitutionary performs the operations performed by the correspondent node.

7. A method of reserving resources in an IP-based mobile network having a mobile node which performs a handover, the method comprising:
- transmitting a plurality of binding process messages from the mobile node to a correspondent node using a plurality of CoAs (care of addresses);
- transmitting binding acknowledgement messages from the correspondent node through a plurality of paths which transfer the plurality of binding process messages;
- transmitting query messages from the correspondent node through the plurality of paths;
- recording available resource information in the query messages by at least one intermediate node on the plurality of paths;
- receiving the query messages at the mobile node;
- selecting, at the mobile node, a first communication path, which transmitted a query message, as a selected communication path, wherein the communication path has available resources, of a predetermined resource amount, after analyzing the available resource information which is recorded in the query message;
- when the mobile node receives a plurality of query messages having a same available resource information, selecting, at the mobile node, a communication path which transmitted a query message which arrived first; and
- transmitting a resource reservation message from the mobile node through the selected communication path, wherein,
- the recording step comprises,
- receiving the query messages at the at least one intermediate node on each of a plurality of communication paths;
- comparing own available resource information of the at least one intermediate node and pre-recorded resource information in the query message, if there is a recorded resource information in the query message, and if not, recording the own available resource information in the query message;
- updating the pre-recorded resource information with the own available resource information as the available resource information, if the own available resource information is smaller than the pre-recorded resource information, otherwise maintaining the pre-recorded resource information; and
- transmitting the query message comprising the updated or maintained available resource information toward the correspondent node,
- wherein the at least one intermediate node is located between a plurality of access routers and a crossover node on each of the plurality of paths.

8. The method of claim 7, further comprising:
- assigning a priority, at the mobile node, to each of the received query messages by assigning a higher priority to a query message having available resource information indicating a larger amount of available resources; and
- selecting, at the mobile node, a second communication path, according to the assigned priority when resources through the first communication path, are not reserved.

9. The method of claim 8, wherein the correspondent node selects at least one additional communication path according to the assigned priority, when a maximum amount of the available resources of the selected communication path is smaller than an amount of available resources required by the mobile node.

10. The method of claim 7, further comprising releasing a resource reservation state by transmitting a resource reservation release message to an old access router of the mobile node from a crossover node on the selected communication path.

11. The method of claim 7, wherein a home agent substitutionary performs the operation of the correspondent node.

12. A method of reserving resources to disperse a load of a communication path in an IP-based mobile network, the method comprising:
- communicating, at a mobile node, with a correspondent node through a first predetermined communication path, the mobile node transmitting query messages to a plurality of adjacent access routers by using a plurality of CoAs (care of addresses);
- transmitting the query messages from the access routers to a crossover node;
- recording available resource information in the query messages by at least one intermediate node on each of a plurality of communication paths between the access routers and the crossover node;
- transmitting the query messages to the correspondent node;
- receiving the query messages at the correspondent node;
- selecting, at the correspondent node, a second communication path, which transfers one of the query messages, and which has a maximum available resources, after analyzing the available resource information recorded in the query messages; and
- transmitting a resource reservation message from the correspondent node to the mobile node through the selected second communication path, wherein,
- the recording step comprises,
- receiving the query messages at the at least one intermediate node on each of a plurality of communication paths;
- comparing own available resource information of the at least one intermediate node and pre-recorded resource information in the query message, if there is a recorded resource information in the query message, and if not, recording the own available resource information to the query message;
- updating the pre-recorded resource information with the own available resource information as the available resource information, if the own available resource information is smaller than the pre-recorded resource information, otherwise maintaining the pre-recorded resource information; and
- transmitting the query message comprising the updated or maintained available resource information toward the correspondent node.

13. The method of claim 12, further comprising transmitting first multimedia data traffic and second multimedia data traffic by using the first communication path and the second communication path.

14. The method of claim 13, wherein when the correspondent node receives the query messages having available resource information indicative of a same maximum available resources, then the correspondent node selects a communication path through which one of the query messages is first received.

15. The method of claim 13, further comprising:
- assigning a priority, at the correspondent node, to each of the received query messages by assigning a higher priority to a query message having available resource information indicating a larger amount of available resources; and
- selecting, at correspondent node, at least one additional communication path according to the assigned priority when a maximum amount of available resources of the selected second communication path is smaller than an amount of available resources required by the mobile node.

16. The method of claim 15, further comprising selecting a third communication path according to the assigned priority when resources through the selected second communication path are not reserved.

17. The method of claim 12, wherein the mobile node transmits the query messages when the mobile node determines that data traffic congestion arises on the first communication path.

18. The method of claim 17, further comprising releasing a resource reservation state by transmitting a resource reservation release message to an adjacent access router on the first communication path from a crossover node at which an old communication path meets the second communication path.

19. The method of claim 12, wherein the mobile node transmits the query messages when the mobile node determines that available resources on the first communication path are insufficient.

20. The method of claim 12, wherein a home agent substitutionary performs the operations of the correspondent node.

21. A method of reserving resources to disperse a load of a communication path in an IP based mobile network, the method comprising:
communicating, at a mobile node, with a predetermined correspondent node through a first communication path, the mobile node transmitting a plurality of query messages to the correspondent node by using a plurality of CoAs(care of addresses), through additional communication paths;
recording available resource information in the query messages by at least one intermediate node on a plurality of paths between the mobile node and the correspondent node;
receiving the query messages at the correspondent node;
generating, at the correspondent node, query response messages by copying the received query messages and transmitting the query response messages through the plurality of paths;
receiving the query response messages, at the mobile node, through the plurality of paths, respectively;
selecting, at the mobile node, a second communication path, which transferred one of the query response messages, that has a maximum available resources, after analyzing the available resource information recorded in the query response messages; and
transmitting a resource reservation message from the mobile node to the correspondent node through the second communication path, wherein when a plurality of query messages having available resource information indicating a same maximum available resources are received, one of the plurality of query messages which arrived first is selected, wherein,
the recording step comprises,
receiving the query messages at the at least one intermediate node on each of a plurality of communication paths;
comparing own available resource information of the at least one intermediate node and pre-recorded resource information in the query message, if there is a recorded resource information in the query message, and if not, recording the own available resource information to the query message;
updating the pre-recorded resource information with the own available resource information as the available resource information, if the own available resource information is smaller than the pre-recorded resource information, otherwise maintaining the pre-recorded resource information; and
transmitting the query message comprising the updated or maintained available resource information toward the correspondent node,
wherein the at least one intermediate node is located between a plurality of access routers and a crossover node on each of the plurality of paths.

22. The method of claim 21, further comprising transmitting first multimedia data traffic and second multimedia data traffic by using the first communication path and the second communication path.

23. The method of claim 22, further comprising:
assigning a priority, at the mobile node, to each of the received query response messages by assigning a higher priority to the received query response messages representing a larger amount of available resources; and
selecting, at the mobile node, at least one additional communication path according to the assigned priority when a maximum amount of available resources of the second communication path is smaller than an amount of available resources required by the mobile node.

24. The method of claim 23, wherein a third communication path is selected according to the assigned priority when resources through the second communication path are not reserved.

25. The method of claim 21, wherein the mobile node transmits the query messages when the mobile node determines that a data traffic congestion arises on the first communication path.

26. The method of claim 21, further comprising releasing a resource reservation state by transmitting a resource reservation release message to an access router on the first communication path from a crossover node at which an old communication path meets the second communication path.

27. The method of claim 21, wherein the mobile node transmits the query messages when the mobile node determines that available resources on the first communication path are insufficient.

28. The method of claim 21, wherein a home agent substitutionary performs the operations of the correspondent node.

29. A method of relaying data in an intermediate node operated in an IP based mobile network, the method comprising:
receiving query messages which are transmitted from one side of either a mobile node or a correspondent node;
recording available resource information of the intermediate node in the query messages; and
transmitting the query messages containing the available resource information to the other side of either the mobile node or the correspondent node,
wherein the each of the query messages correspond to one of access routers, wherein,
the recording step comprises,
comparing own available resource information of the intermediate node and pre-recorded resource information in the query message, if there is a recorded resource information in the query message, and if not, recording the own available resource information to the query message; and
updating the pre-recorded resource information with the own available resource information of the intermediate node as the available resource information if the own available resource information is smaller than the pre-recorded resource information, otherwise maintaining the pre-recorded resource information, wherein the intermediate node is located between a plurality of access routers and a crossover node on each of a plurality of paths.

30. A method of reserving resources in a mobile node, the method comprising:
- transmitting a plurality of binding process messages from the mobile node to a correspondent node using a plurality of CoAs (care of addresses);
- receiving binding acknowledgement messages and query messages in response to the binding process messages from the correspondent node through a plurality of paths which transfer the plurality of binding process messages;
- detecting available resource information recorded in the query messages during relaying through each of the paths;
- selecting a path having a predetermined amount of available resources by analyzing the available resource information recorded in the query messages received through each of the plurality of paths, when the mobile node receives a plurality of query messages having a same available resource information, selecting, at the mobile node, a communication path which transmitted a query message which arrived first; and
- transmitting a resource reservation message from the mobile node to the correspondent node through the selected path, wherein,
- the available resource information recorded in the each of query messages is the smallest available resource information among available resource information of intermediate nodes on each of the paths,
- wherein intermediate nodes are located between a plurality of access routers and a crossover node on each of the plurality of paths.

* * * * *